US010997514B1

United States Patent
Moriarty et al.

(10) Patent No.: US 10,997,514 B1
(45) Date of Patent: May 4, 2021

(54) SYSTEMS AND METHODS FOR AUTOMATIC INDIVIDUAL MISCONCEPTION REMEDIATION

(71) Applicant: Pearson Education, Inc., New York, NY (US)

(72) Inventors: Brian Moriarty, New York, NY (US); Mark Potter, New York, NY (US)

(73) Assignee: PEARSON EDUCATION, INC., New York, NY (US)

( * ) Notice: Subject to any disclaimer, the term of this patent is extended or adjusted under 35 U.S.C. 154(b) by 1275 days.

(21) Appl. No.: 15/247,775

(22) Filed: Aug. 25, 2016

Related U.S. Application Data

(63) Continuation of application No. 15/236,238, filed on Aug. 12, 2016, now Pat. No. 10,614,368.

(60) Provisional application No. 62/320,213, filed on Apr. 8, 2016.

(51) Int. Cl.
  *G06N 7/00* (2006.01)
  *H04L 29/08* (2006.01)

(52) U.S. Cl.
  CPC ............ *G06N 7/005* (2013.01); *H04L 67/22* (2013.01)

(58) Field of Classification Search
  None
  See application file for complete search history.

(56) References Cited

U.S. PATENT DOCUMENTS 5,727,950 A * 3/1998 Cook .................... G09B 19/06
                                                             434/350
5,945,988 A * 8/1999 Williams ............. G11B 27/105
                                                             348/E17.005
6,023,692 A    2/2000 Nichols
6,049,777 A    4/2000 Sheena et al.
6,112,186 A    8/2000 Bergh et al.
(Continued)

FOREIGN PATENT DOCUMENTS

WO     2009/149262 A1    12/2009

OTHER PUBLICATIONS

Jackson, G.T. et al. (2006). "AutoTutor 3-D Simulations: Analyzing Users' Actions and Learning Trends." Proceedings of the Annual Meeting of the Cognitive Science Society. vol. 28. No. 28. 2006. pp. 1557-1562. (Year: 2006).*

(Continued)

*Primary Examiner* — Kamran Afshar
*Assistant Examiner* — Benjamin J Buss
(74) *Attorney, Agent, or Firm* — Quarles & Brady LLP

(57) ABSTRACT

Systems and methods for content selection with first and second recommendation engines are disclosed herein. The system can include a memory include a content library database and a model database. The system can include a user device having a first network interface and a first I/O subsystem. The system can include one or more servers that can include a packet selection system and a presentation system. These one or more servers can: receive response data from the user device; provide received response data to a first recommendation engine; alert a second recommendation engine when a selected next node is a placeholder node; retrieve at least one statistical model relevant to selection of next node content; and select next node content based on an output of the at least one statistical model.

20 Claims, 23 Drawing Sheets

(56) References Cited

U.S. PATENT DOCUMENTS

| | | | |
|---|---|---|---|
| 6,807,535 B2* | 10/2004 | Goodkovsky | G09B 7/04 706/3 |
| 7,747,369 B2 | 6/2010 | Koehrsen | |
| 7,828,552 B2 | 11/2010 | Shute | |
| 7,957,363 B2 | 6/2011 | Deen et al. | |
| 8,249,868 B2 | 8/2012 | Lloyd | |
| 8,550,822 B2 | 10/2013 | Templin | |
| 8,666,740 B2 | 3/2014 | Lloyd | |
| 8,768,782 B1* | 7/2014 | Myslinski | A63F 13/00 705/26.1 |
| 8,774,043 B2 | 7/2014 | Vilke | |
| 9,246,822 B2 | 1/2016 | Vilke | |
| 9,654,175 B1 | 5/2017 | Lowrie | |
| 2002/0052859 A1* | 5/2002 | Rosenfeld | G09B 7/04 706/47 |
| 2002/0071393 A1 | 6/2002 | Musoll | |
| 2002/0107681 A1 | 8/2002 | Goodkovsky | |
| 2002/0184020 A1 | 12/2002 | Shinoda | |
| 2003/0082508 A1 | 5/2003 | Barney | |
| 2004/0153373 A1 | 8/2004 | Song et al. | |
| 2005/0234763 A1 | 10/2005 | Pinto | |
| 2005/0288954 A1 | 12/2005 | McCarthy et al. | |
| 2006/0040247 A1 | 2/2006 | Templin | |
| 2006/0117077 A1 | 6/2006 | Kiiveri | |
| 2006/0199165 A1 | 9/2006 | Crowhurst et al. | |
| 2006/0204040 A1 | 9/2006 | Freeman | |
| 2006/0212386 A1 | 9/2006 | Willey | |
| 2006/0286533 A1* | 12/2006 | Hansen | G09B 7/00 434/323 |
| 2007/0085840 A1 | 4/2007 | Asaka et al. | |
| 2007/0172808 A1 | 7/2007 | Capone | |
| 2008/0015793 A1 | 1/2008 | Ben-Menahem | |
| 2008/0288461 A1 | 11/2008 | Glennon et al. | |
| 2008/0319829 A1 | 12/2008 | Hunt | |
| 2009/0012761 A1* | 1/2009 | Bertrand | G09B 7/00 703/6 |
| 2009/0037398 A1 | 2/2009 | Horvitz | |
| 2009/0268830 A1 | 10/2009 | Birru | |
| 2010/0010878 A1 | 1/2010 | Pinto | |
| 2010/0120422 A1 | 5/2010 | Cheung | |
| 2010/0190142 A1 | 7/2010 | Gal | |
| 2011/0040896 A1 | 2/2011 | DeCusatis et al. | |
| 2011/0177480 A1 | 7/2011 | Menon et al. | |
| 2012/0231437 A1 | 9/2012 | Fakhrai | |
| 2012/0265783 A1 | 10/2012 | Kenedy | |
| 2012/0314599 A1 | 12/2012 | Vilke | |
| 2013/0029300 A1* | 1/2013 | Tashiro | G09B 23/28 434/219 |
| 2013/0163837 A1 | 6/2013 | Zabair | |
| 2013/0173517 A1 | 7/2013 | Berus | |
| 2013/0226839 A1 | 8/2013 | Archambeau | |
| 2013/0262365 A1 | 10/2013 | Dolbear et al. | |
| 2013/0266925 A1 | 10/2013 | Nunamaker, Jr. | |
| 2013/0280690 A1* | 10/2013 | Menon | G09B 7/02 434/362 |
| 2013/0288222 A1* | 10/2013 | Stacy | G09B 7/00 434/362 |
| 2014/0130076 A1 | 5/2014 | Moore et al. | |
| 2014/0141888 A1 | 5/2014 | Pavlish | |
| 2014/0157371 A1 | 6/2014 | Le Chevalier | |
| 2014/0164994 A1* | 6/2014 | Myslinski | G06Q 10/00 715/808 |
| 2014/0177544 A1* | 6/2014 | Kumar | H04L 47/805 370/329 |
| 2014/0254376 A1 | 9/2014 | Vilke | |
| 2014/0272889 A1 | 9/2014 | Kulkarni et al. | |
| 2015/0006454 A1 | 1/2015 | Supanc et al. | |
| 2015/0058336 A1 | 2/2015 | Davis et al. | |
| 2015/0170536 A1 | 6/2015 | Lan | |
| 2015/0206441 A1 | 7/2015 | Brown | |
| 2015/0213722 A1 | 7/2015 | Nypl et al. | |
| 2015/0242978 A1 | 8/2015 | Zaslavsky et al. | |
| 2015/0269941 A1 | 9/2015 | Jones | |
| 2015/0316383 A1 | 11/2015 | Donikian | |
| 2015/0317582 A1 | 11/2015 | Nath | |
| 2015/0332372 A1 | 11/2015 | Hariri | |
| 2015/0347508 A1 | 12/2015 | Lang | |
| 2015/0356420 A1 | 12/2015 | Byron | |
| 2015/0371163 A1* | 12/2015 | Noh | G06Q 10/0635 705/7.28 |
| 2016/0005323 A1 | 1/2016 | Nkambou et al. | |
| 2016/0124999 A1 | 5/2016 | Brenes et al. | |
| 2016/0127010 A1 | 5/2016 | Rho et al. | |
| 2016/0127244 A1 | 5/2016 | Brenes et al. | |
| 2016/0127248 A1 | 5/2016 | Brenes et al. | |
| 2016/0155345 A1 | 6/2016 | Wang | |
| 2017/0178002 A1* | 6/2017 | Moriarty | H04L 67/2838 |
| 2017/0220933 A1* | 8/2017 | Gonguet | G06Q 50/01 |

OTHER PUBLICATIONS

Chen, C.-M. et al. (2005). "Mining learner profile utilizing association rule for common learning misconception diagnosis." Fifth IEEE International Conference on Advanced Learning Technologies (ICALT'05). IEEE, 2005. 5 pages. DOI:10.1109/ICALT.2005.198 (Year: 2005).*

Chen, C.-M. et al. (2007). "Mining learner profile utilizing association rule for web-based learning diagnosis." Expert Systems with Applications 33.1 (2007): 6-22. DOI:10.1016/j.eswa.2006.04.025 (Year: 2007).*

Jong, B.-S. et al. (2006). "Applying the adaptive learning material producing strategy to group learning." International Conference on Technologies for E-Learning and Digital Entertainment. Springer, Berlin, Heidelberg, 2006. pp. 39-49. (Year: 2006).*

Lin, Y.-H. (2010). "Integration of item hierarchy and concept tree based on clustering approach with application in statistics learning." WSEAS Transactions on Information Science and Applications 7.7 (2010): 912-922. (Year: 2010).*

Huang, Y.-M. et al. (2008). "Toward interactive mobile synchronous learning environment with context-awareness service." Computers & Education 51.3 (2008): 1205-1226. DOI:10.1016/j.compedu.2007.11.009 (Year: 2014).*

Hassan, N. et al. (Jul. 2015). "The quest to automate fact-checking." In Proceedings of the 2015 Computation+ Journalism Symposium. 5 pages. (Year: 2015).*

Vlachos, A. et al. (2014). "Fact checking: Task definition and dataset construction." Proceedings of the ACL 2014 Workshop on Language Technologies and Computational Social Science. 2014. pp. 18-22. (Year: 2014).*

Foster, D.A. (1995). "FRA: Teaching Financial Accounting with a Goal-Based Scenario". Intelligent Systems in Accounting. Finance and Management vol. 4: 173-189.

Ghiassi, M. et al. (1992). "An Integrated Software Testing System Based on an Object-Oriented DBMS". IEEE. 9 pages.

Marcus, N. et al. (Apr. 2011). "Instructional support for teachers and guided feedback for students in an adaptive elearning environment". In Information Technology: New Generations (ITNG), 2011 Eighth International Conference on (pp. 626-631 ). IEEE. DOI: 10.1109/ITNG.2011.111.

Thomas, P.G. et al. (1998). "AESOP—An Electronic Student Observatory Project". 5 pages.

Chen, C-M, et al. (2004), "A personalized courseware recommendation system based on fuzzy item response theory", e-Technology, e-Commerce and e-Service, 2004, EEE'04, 2004 IEEE International Conference on, IEE, 2004, DOI: 10.1109/EEE.2004.1287327.

International Search Report and Written Opinion dated Feb. 23, 2016 for International Application No. PCT/US2015/058467.

* cited by examiner

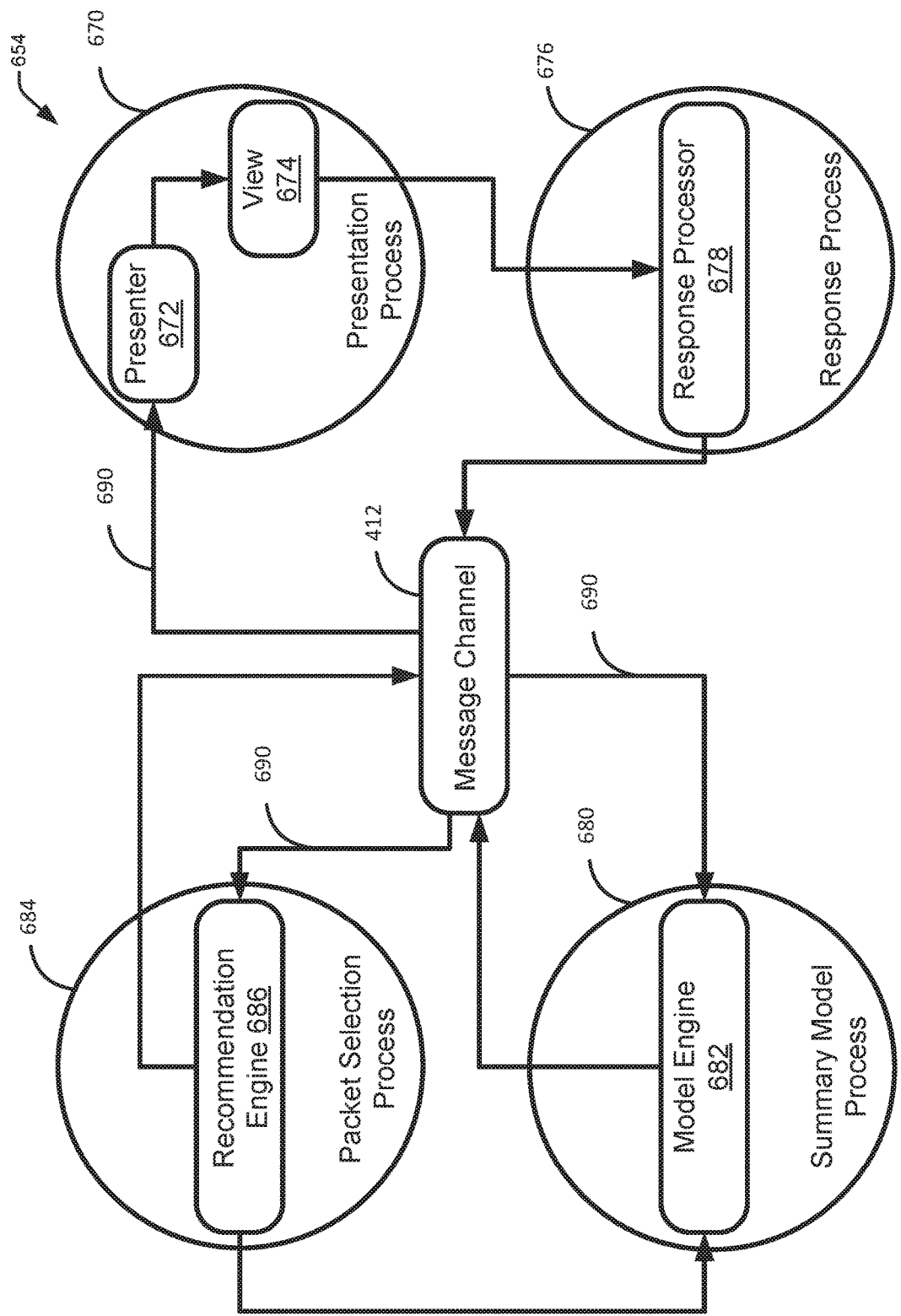

SYSTEMS AND METHODS FOR AUTOMATIC INDIVIDUAL MISCONCEPTION REMEDIATION

CROSS-REFERENCE TO RELATED APPLICATIONS

This application is a continuation of U.S. application Ser. No. 15/236,238, filed on Aug. 12, 2016, and entitled "SYSTEM AND METHOD FOR CONTENT PROVISIONING WITH DUAL RECOMMENDATION ENGINES", which claims the benefit of U.S. Provisional Application No. 62/320,213, filed on Apr. 8, 2016, and entitled "ADAPTIVE PATHWAYS AND COGNITIVE TUTORING", the entirety of which is hereby incorporated by reference herein.

BACKGROUND

A computer network or data network is a telecommunications network which allows computers to exchange data. In computer networks, networked computing devices exchange data with each other along network links (data connections). The connections between nodes are established using either cable media or wireless media. The best-known computer network is the Internet.

Network computer devices that originate, route and terminate the data are called network nodes. Nodes can include hosts such as personal computers, phones, servers as well as networking hardware. Two such devices can be said to be networked together when one device is able to exchange information with the other device, whether or not they have a direct connection to each other.

Computer networks differ in the transmission media used to carry their signals, the communications protocols to organize network traffic, the network's size, topology and organizational intent. In most cases, communications protocols are layered on other more specific or more general communications protocols, except for the physical layer that directly deals with the transmission media.

BRIEF SUMMARY

One aspect of the present disclosure relates to a system for content selection with first and second recommendation engines. In some embodiments, the system can include a memory. The memory can include: a content library database and a model database. In some embodiments, the content library database can include a plurality of nodes arranged in a content network. In some embodiments, the nodes in the content network are pairwise connected via a plurality of edges. In some embodiments, some of the nodes in the content network are associated with a data packet and a guard condition. In some embodiments, some of the nodes in the content network are associated with a database of placeholder content. In some embodiments, the model database can include a plurality of models relating to at least one of: a user skill level or a data packet difficulty level, which models can be, for example, statistical models. The system can include a user device. The user device can include a first network interface that can exchange data via a communication network. The user device can include a first I/O subsystem that can convert electrical signals to user interpretable outputs via a user interface. The system can include one or more servers. These one or more servers can include a packet selection system and a presentation system. In some embodiments, the one or more servers can be controlled according to software executed by the one or more servers. In some embodiments, this software can control the server to: receive response data from the user device; provide received response data to a first recommendation engine, and which first recommendation engine can select a next node based on: a current location in the content network, potential next nodes, past response data, and one or several guard conditions associated with the potential next nodes. In some embodiments, the processor can be controlled to: alert a second recommendation engine when a selected next node includes a placeholder node, which placeholder node is associated with a database of placeholder content; retrieve at least one model relevant to selection of next node content; and select next node content based on an output of the at least one model.

In some embodiments, providing received response data to the first recommendation engine further includes selecting a next node. In some embodiments, selecting the next node includes: identifying potential next nodes; and retrieving guard conditions. In some embodiments, each guard condition defines one or several prerequisites for entry into one of the potential next nodes.

In some embodiments, identifying potential next nodes includes: identifying the user's location in the content network, which location in the content network is at an origin node; identifying edges extending from the origin node; and identifying non-prerequisite nodes connected to the origin node via the identified edges. In some embodiments, selecting the next node further includes: identifying the user associated with the user device; and retrieving the user history from the memory.

In some embodiments, selecting the next node further includes application of the user history to the guard conditions of the potential next nodes. In some embodiments, application of the user history to the guard conditions of the potential next nodes includes: (a) selecting one of the potential next nodes; (b) identification of a guard condition associated with the selected potential next node; (c) comparing the guard condition with the user history; and (d) associating a first value with the selected one of the potential next nodes when the comparison of the guard condition with the user history indicates that the guard condition is met. In some embodiments, steps (a)-(d) are repeated for each of the potential next nodes.

In some embodiments, selecting next node content based on an output of the at least one model includes: identifying the user associated with the user device; retrieving the user history; and identifying potential next node content. In some embodiments, selecting next node content based on an output of the at least one model includes: identifying one or several features of at least one of: the potential next node content or the user history; extracting the identified one or several features; and inputting some or all of the one or several features into the retrieved at least one model. In some embodiments, selecting next node content based on an output of the at least one model includes generating an output with the retrieved at least one model based on the input of some or all of the one or several features.

In some embodiments, the one or more servers are further configured to provide the selected next node content to the user device. In some embodiments, providing the selected next node content to the user device includes: generating a plurality of electrical signals containing the selected next node content; and sending the electrical signal to the user device. In some embodiments, the first recommendation engine is contained in the presentation system and wherein the second recommendation engine is contained in the packet selection system.

One aspect of the present disclosure relates to a method for content selection with first and second recommendation engines. The method includes: receiving response data from a user device at one or more servers including a packet selection system and a presentation system; automatically providing received response data to a first recommendation engine, which first recommendation engine can select a next node based on at least one of: a current location in the content network; potential next nodes; past response data; or one or several guard conditions associated with the potential next nodes; and alerting a second recommendation engine when a selected next node is a placeholder node. In some embodiments, the placeholder node is associated with a database of placeholder content. The method can include: retrieving at least one model relevant to selection of next node content from a model database including a plurality of models relating to at least one of: a user skill level or a data packet difficulty level; and selecting next node content based on an output of the at least one model.

In some embodiments, the method can include providing the selected next node content to the user device. In some embodiments, providing the selected next node content to the user device includes: generating a plurality of electrical signals containing or encoding the selected next node content; and sending the electrical signal to the user device. In some embodiments, the first recommendation engine is in the presentation system and the second recommendation engine is in the packet selection system.

In some embodiments, selecting next node content based on an output of the at least one model includes: identifying the user associated with the user device; retrieving the user history; and identifying potential next node content. In some embodiments, selecting next node content based on an output of the at least one model includes: identifying one or several features of at least one of: the potential next node content or the user history; extracting the identified one or several features; and inputting some or all of the one or several features into the retrieved at least one model.

One aspect of the present disclosure relate to a method of hybrid content provisioning. The method includes: receiving user identification information, which user identification information identifies a user; determining the location of the user in a content network comprising a plurality of nodes linked in a sequential relationship; identifying potential next nodes based on the location of the user in the content network; determining a next node from the potential next nodes; and providing next content to the user, which next content is directly linked to the next node when the next node is not a placeholder node, and which next content is provided from a database of placeholder content associated with determined next node when the next node is a placeholder node. In some embodiments, some or all of the nodes are each associated with a guard condition. In some embodiments, each guard condition identifies a condition for entrance into the node associated with that guard condition.

One aspect of the present disclosure relates to a method of content provisioning with distributed presentation engines. The method includes: receiving a data packet at a presenter module in at least one server; extracting packet metadata from the received data packet, which packet metadata identifies at least one attribute of the received data packet; providing delivery portions of the received data packet to a view module located in a user device; receiving a data request at the presenter module from the view module; retrieving a second data packet corresponding to the data request at the presenter module; and receiving a response to the provided delivery portion of the received data packet.

One aspect of the present disclosure relates to a method for automatic data packet. The method includes: identifying a user cohort, which user cohort includes a plurality of user sharing a common attribute; providing a data packet to the users in the user cohort; receiving responses to the provided data packet from the user in the user cohort; translating each of the received responses into an observable, which observable includes a characterization of the received response; generating response cohorts including groups of users in the user cohort, which response cohorts are generated based on commonalities in the observables of the received responses; identifying a misconception based on the comparison of a cohort percentage and a misconception threshold, and generating and sending an alert to a user device requesting modification of at least one data packet associated with the misconception.

One aspect of the present disclosure relates to a method for automatic triggering of a targeted intervention. The method includes: selecting a user with at least one server; receiving user metadata associated with the identified user from a user profile database in a memory at the at least one server; determining that the user is associated with a potential misconception; retrieving metadata of the selected user indicative of the presence or absence of the potential misconception with which the user is associated; determining that the potential misconception is not confirmed in the user based on a comparison of a misconception threshold and metadata indicative of the presence or absence of the potential misconception with which the user is associated; updating the user metadata based on responses received from the user and relating to a plurality of provided supplemental data packets in the user profile database; confirming the presence of the misconception based on the updated user metadata; and automatically triggering a targeted intervention. In some embodiments, the potential misconception can be identified based on the association of the user with a cohort linked with a misconception, which cohort can be a group of users having common attributes of observables generated from one or several responses provided by the users in the cohort. In some embodiments, the intervention can include interaction with an AI agent. The AI agent communicatingly linked with the user device via a communication network.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

FIG. 9A is a schematic illustration of one embodiment of communication and processing flow of modules within the content distribution network.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

This application is related to U.S. application Ser. No. 15/236,196, filed on Aug. 12, 2016, and entitled SYSTEMS AND METHODS OF EVENT-BASED CONTENT PROVISIONING; U.S. application Ser. No. 15/236,103, filed on Aug. 12, 2016, and entitled SYSTEMS AND METHODS FOR DATA PACKET METADATA STABILIZATION; and U.S. application Ser. No. 15/236,275, filed on Aug. 12, 2016, and entitled SYSTEM AND METHOD FOR AUTOMATIC CONTENT AGGREGATION GENERATION, the entirety of each of which is hereby incorporated by reference herein.

Figure 1:
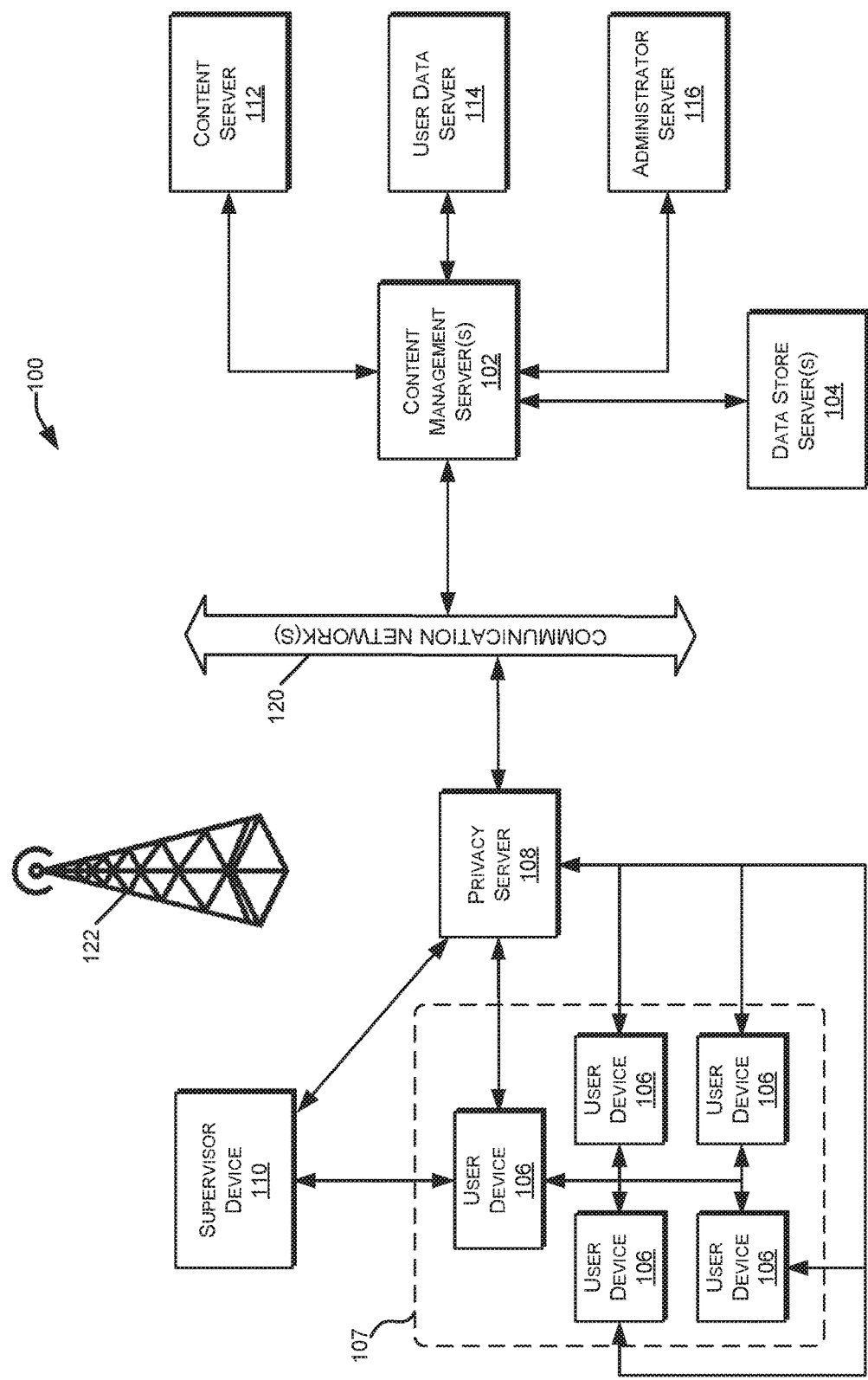
FIG. 1 is a block diagram illustrating an example of a content distribution network.

With reference now to FIG. 1, a block diagram is shown illustrating various components of a content distribution network (CDN) 100 which implements and supports certain embodiments and features described herein. In some embodiments, the content distribution network 100 can comprise one or several physical components and/or one or several virtual components such as, for example, one or several cloud computing components. In some embodiments, the content distribution network 100 can comprise a mixture of physical and cloud computing components.

Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing unit, memory systems, hard drives, network interfaces, power supplies, etc. Content management server 102 may include one or more server farms, clusters, or any other appropriate arrangement and/or combination of computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provide access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as thin-client computers, Internet-enabled gaming systems, business or home appliances, and/or personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including his or her user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

The content distribution network 100 may include one or several navigation systems or features including, for example, the Global Positioning System ("GPS"), GALILEO, or the like, or location systems or features including, for example, one or several transceivers that can determine location of the one or several components of the content distribution network 100 via, for example, triangulation. All of these are depicted as navigation system 122.

In some embodiments, navigation system 122 can include one or several features that can communicate with one or several components of the content distribution network 100 including, for example, with one or several of the user devices 106 and/or with one or several of the supervisor devices 110. In some embodiments, this communication can include the transmission of a signal from the navigation system 122 which signal is received by one or several components of the content distribution network 100 and can be used to determine the location of the one or several components of the content distribution network 100.

Figure 2:
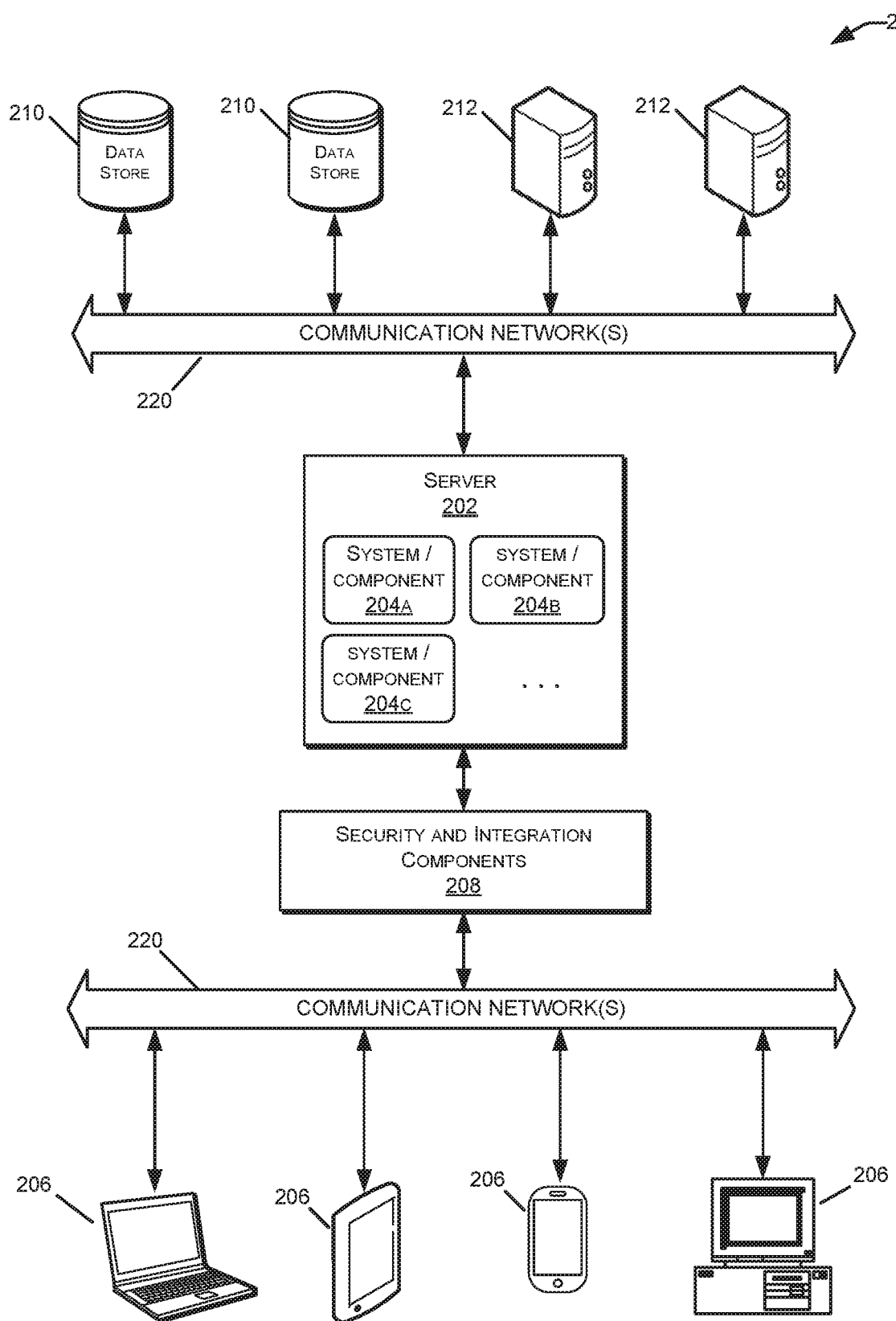
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser-based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/ or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML, encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
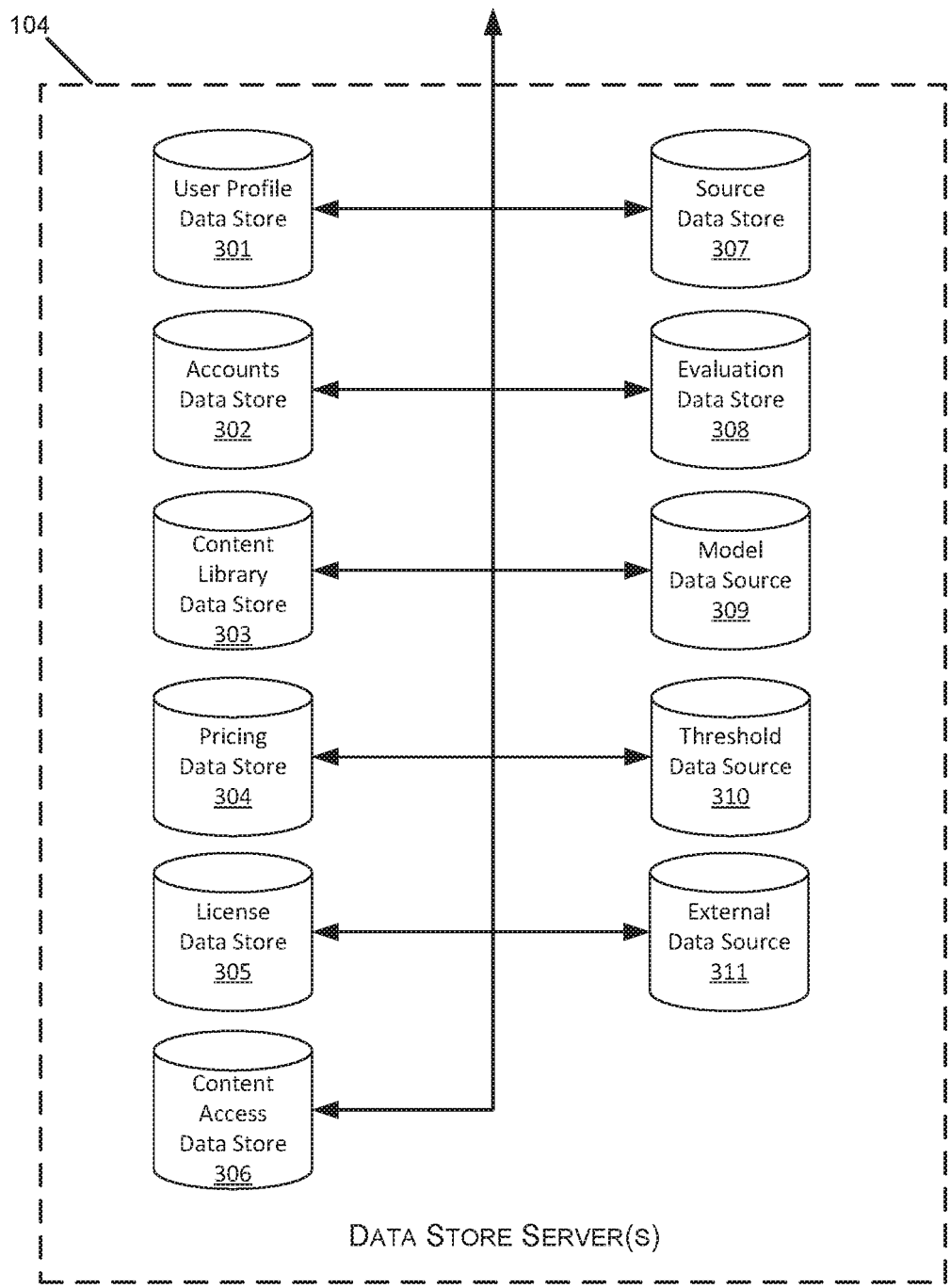
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-311 may reside in storage on a single computer server 104 (or a single server farm or cluster) under the control of a single entity, or may reside on separate servers operated by different entities and/or at remote locations. In some embodiments, data stores 301-311 may be accessed by the content management server 102 and/or other devices and servers within the network 100 (e.g., user devices 106, supervisor devices 110, administrator servers 116, etc.). Access to one or more of the data stores 301-311 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-311, including their functionality and types of data stored therein, are illustrative and non-limiting. Data stores server architecture, design, and the execution of specific data stores 301-311 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

The user profile database 301 can include information relating to a user's status, location, or the like. This information can identify, for example, a device a user is using, the location of that device, or the like. In some embodiments, this information can be generated based on any location detection technology including, for example, a navigation system 122, or the like.

Information relating to the user's status can identify, for example, logged-in status information that can indicate whether the user is presently logged-in to the content distribution network 100 and/or whether the log-in-is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several student learning preferences. In some embodiments, for example, the user, also referred to herein as the student or the student-user may have one or several preferred learning styles, one or several most effective learning styles, and/or the like. In some embodiments, the student's learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

In some embodiments, the user profile data store 301 can further include information identifying one or several user skill levels. In some embodiments, these one or several user skill levels can identify a skill level determined based on past performance by the user interacting with the content delivery network 100, and in some embodiments, these one or several user skill levels can identify a predicted skill level determined based on past performance by the user interacting with the content delivery network 100 and one or several predictive models.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources or data packets) available via the content distribution network 100. In some embodiments, these data packets in the content library database 303 can be linked to form an object network. In some embodiments, these data packets can be linked in the object network according to one or several sequential relationship which can be, in some embodiments, prerequisite relationships that can, for example, identify the relative hierarchy and/or difficulty of the data objects. In some embodiments, this hierarchy of data objects can be generated by the content distribution network 100 according to user experience with the object network, and in some embodiments, this hierarchy of data objects can be generated based on one or several existing and/or external hierarchies such as, for example, a syllabus, a table of contents, or the like. In some embodiments, for example, the object network can correspond to a syllabus such that content for the syllabus is embodied in the object network.

In some embodiments, the content library data store 303 can comprise a syllabus, a schedule, or the like. In some embodiments, the syllabus or schedule can identify one or several tasks and/or events relevant to the user. In some embodiments, for example, when the user is a member of a group such as a section or a class, these tasks and/or events relevant to the user can identify one or several assignments, quizzes, exams, or the like.

In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

In some embodiments, the content library data store 303 can contain information used in evaluating responses received from users. In some embodiments, for example, a user can receive content from the content distribution network 100 and can, subsequent to receiving that content, provide a response to the received content. In some embodiments, for example, the received content can comprise one or several questions, prompts, or the like, and the response to the received content can comprise an answer to those one or several questions, prompts, or the like. In some embodiments, information, referred to herein as "comparative data," from the content library data store 303 can be used to determine whether the responses are the correct and/or desired responses.

In some embodiments, the content library database 303 and/or the user profile database 301 can comprise an aggregation network, also referred to herein as a content network or content aggregation network. The aggregation network can comprise a plurality of content aggregations that can be linked together by, for example: creation by common user; relation to a common subject, topic, skill, or the like; creation from a common set of source material such as source data packets; or the like. In some embodiments, the content aggregation can comprise a grouping of content comprising the presentation portion that can be provided to the user in the form of, for example, a flash card and an extraction portion that can comprise the desired response to the presentation portion such as for example, an answer to a flash card. In some embodiments, one or several content aggregations can be generated by the content distribution network 100 and can be related to one or several data packets that can be, for example, organized in object network. In some embodiments, the one or several content aggregations can be each created from content stored in one or several of the data packets.

In some embodiments, the content aggregations located in the content library database 303 and/or the user profile database 301 can be associated with a user-creator of those content aggregations. In some embodiments, access to content aggregations can vary based on, for example, whether a user created the content aggregations. In some embodiments, the content library database 303 and/or the user profile database 301 can comprise a database of content aggregations associated with a specific user, and in some embodiments, the content library database 303 and/or the user profile database 301 can comprise a plurality of databases of content aggregations that are each associated with a specific user. In some embodiments, these databases of content aggregations can include content aggregations created by their specific user and, in some embodiments, these databases of content aggregations can further include content aggregations selected for inclusion by their specific user and/or a supervisor of that specific user. In some embodiments, these content aggregations can be arranged and/or linked in a hierarchical relationship similar to the data packets in the object network and/or linked to the object network in the object network or the tasks or skills associated with the data packets in the object network or the syllabus or schedule.

In some embodiments, the content aggregation network, and the content aggregations forming the content aggregation network can be organized according to the object network and/or the hierarchical relationships embodied in the object network. In some embodiments, the content aggregation network, and/or the content aggregations forming the content aggregation network can be organized according to one or several tasks identified in the syllabus, schedule or the like.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

A model data store 309, also referred to herein as a model database 309, can store information relating to one or several predictive models which predictive models can be, for example, statistical models. In some embodiments, these can include one or several evidence models, risk models, skill models, or the like. In some embodiments, an evidence model can be a mathematically-based statistical model. The evidence model can be based on, for example, Item Response Theory (IRT), Bayesian Network (Bayes net), Performance Factor Analysis (PFA), or the like. The evidence model can, in some embodiments, be customizable to a user and/or to one or several content items. Specifically, one or several inputs relating to the user and/or to one or several content items can be inserted into the evidence model. These inputs can include, for example, one or several measures of user skill level, one or several measures of content item difficulty and/or skill level, or the like. The customized evidence model can then be used to predict the likelihood of the user providing desired or undesired responses to one or several of the content items.

In some embodiments, the risk models can include one or several models that can be used to calculate one or several model function values. In some embodiments, these one or several model function values can be used to calculate a risk probability, which risk probability can characterize the risk of a user such as a student-user failing to achieve a desired outcome such as, for example, failing to correctly respond to one or several data packets, failure to achieve a desired level of completion of a program, for example in a pre-defined time period, failure to achieve a desired learning outcome, or the like. In some embodiments, the risk probability can identify the risk of the student-user failing to complete 60% of the program.

In some embodiments, these models can include a plurality of model functions including, for example, a first model function, a second model function, a third model function, and a fourth model function. In some embodiments, some or all of the model functions can be associated with a portion of the program such as, for example, a completion stage and/or completion status of the program. In one embodiment, for example, the first model function can be associated with a first completion status, the second model function can be associated with a second completion status, the third model function can be associated with a third completion status, and the fourth model function can be associated with a fourth completion status. In some embodiments, these completion statuses can be selected such that some or all of these completion statuses are less than the desired level of completion of the program. Specifically, in some embodiments, these completion statuses can be selected to all be at less than 60% completion of the program, and more specifically, in some embodiments, the first completion status can be at 20% completion of the program, the second completion status can be at 30% completion of the program, the third completion status can be at 40% completion of the program, and the fourth completion status can be at 50% completion of the program. Similarly, any desired number of model functions can be associated with any desired number of completion statuses.

In some embodiments, a model function can be selected from the plurality of model functions based on a student-user's progress through a program. In some embodiments, the student-user's progress can be compared to one or several status trigger thresholds, each of which status trigger thresholds can be associated with one or more of the model functions. If one of the status triggers is triggered by the student-user's progress, the corresponding one or several model functions can be selected.

The model functions can comprise a variety of types of models and/or functions. In some embodiments, each of the model functions outputs a function value that can be used in calculating a risk probability. This function value can be calculated by performing one or several mathematical operations on one or several values indicative of one or several user attributes and/or user parameters, also referred to herein as program status parameters. In some embodiments, each of the model functions can use the same program status parameters, and in some embodiments, the model functions can use different program status parameters. In some embodiments, the model functions use different program status parameters when at least one of the model functions uses at least one program status parameter that is not used by others of the model functions.

In some embodiments, a skill model can comprise a statistical model identifying a predictive skill level of one or several students. In some embodiments, this model can identify a single skill level of a student and/or a range of possible skill levels of a student. In some embodiments, this statistical model can identify a skill level of a student-user and an error value or error range associated with that skill level. In some embodiments, the error value can be associated with a confidence interval determined based on a confidence level. Thus, in some embodiments, as the number of student interactions with the content distribution network increases, the confidence level can increase and the error value can decrease such that the range identified by the error value about the predicted skill level is smaller.

A threshold database 310, also referred to herein as a threshold database, can store one or several threshold values. These one or several threshold values can delineate between states or conditions. In one exemplary embodiment, for example, a threshold value can delineate between an acceptable user performance and an unacceptable user performance, between content appropriate for a user and content that is inappropriate for a user, between risk levels, or the like.

In addition to the illustrative data stores described above, data store server(s) 104 (e.g., database servers, file-based storage servers, etc.) may include one or more external data aggregators 311. External data aggregators 311 may include third-party data sources accessible to the content management network 100, but not maintained by the content management network 100. External data aggregators 311 may include any electronic information source relating to the users, content resources, or applications of the content distribution network 100. For example, external data aggregators 311 may be third-party data stores containing demographic data, education-related data, consumer sales data, health-related data, and the like. Illustrative external data aggregators 311 may include, for example, social networking web servers, public records data stores, learning management systems, educational institution servers, business servers, consumer sales data stores, medical record data stores, etc. Data retrieved from various external data aggregators 311 may be used to verify and update user account information, suggest user content, and perform user and content evaluations.

Figure 4:
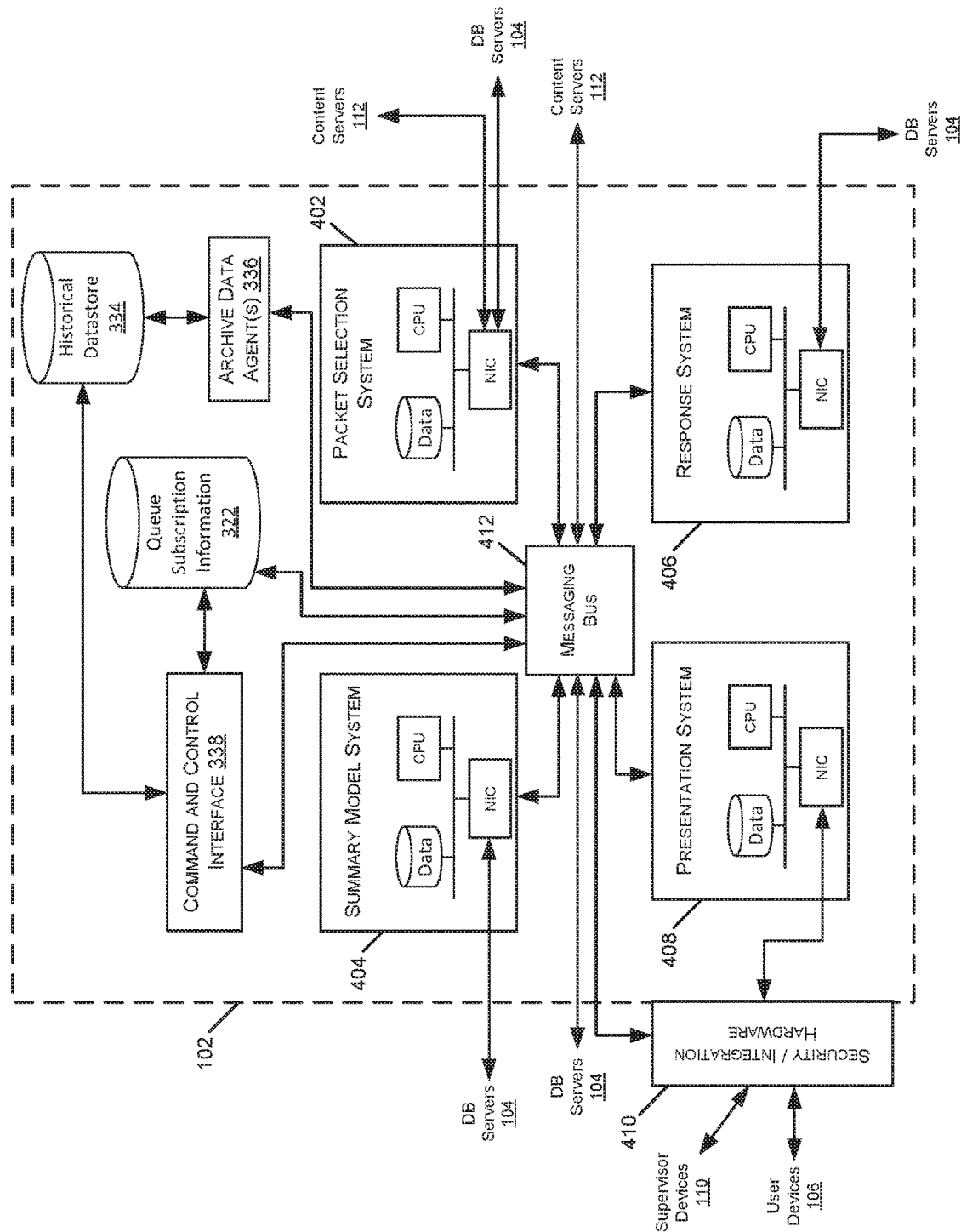
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. In such an embodiment, content management server 102 performs internal data gathering and processing of streamed content along with external data gathering and processing. Other embodiments could have either all external or all internal data gathering. This embodiment allows reporting timely information that might be of interest to the reporting party or other parties. In this embodiment, the content management server 102 can monitor gathered information from several sources to allow it to make timely business and/or processing decisions based upon that information. For example, reports of user actions and/or responses, as well as the status and/or results of one or several processing tasks could be gathered and reported to the content management server 102 from a number of sources.

Internally, the content management server 102 gathers information from one or more internal components 402-408. The internal components 402-408 gather and/or process information relating to such things as: content provided to users; content consumed by users; responses provided by users; user skill levels; content difficulty levels; next content for providing to users; etc. The internal components 402-408 can report the gathered and/or generated information in real-time, near real-time or along another time line. To account for any delay in reporting information, a time stamp or staleness indicator can inform others of how timely the information was sampled. The content management server 102 can opt to allow third parties to use internally or externally gathered information that is aggregated within the server 102 by subscription to the content distribution network 100.

A command and control (CC) interface 338 configures the gathered input information to an output of data streams, also referred to herein as content streams. APIs for accepting gathered information and providing data streams are provided to third parties external to the server 102 who want to subscribe to data streams. The server 102 or a third party can design as yet undefined APIs using the CC interface 338. The server 102 can also define authorization and authentication parameters using the CC interface 338 such as authentication, authorization, login, and/or data encryption. CC information is passed to the internal components 402-408 and/or other components of the content distribution network 100 through a channel separate from the gathered information or data stream in this embodiment, but other embodiments could embed CC information in these communication channels. The CC information allows throttling information reporting frequency, specifying formats for information and data streams, deactivation of one or several internal components 402-408 and/or other components of the content distribution network 100, updating authentication and authorization, etc.

The various data streams that are available can be researched and explored through the CC interface 338. Those data stream selections for a particular subscriber, which can be one or several of the internal components 402-408 and/or other components of the content distribution network 100, are stored in the queue subscription information database 322. The server 102 and/or the CC interface 338 then routes selected data streams to processing subscribers that have selected delivery of a given data stream. Additionally, the server 102 also supports historical queries of the various data streams that are stored in an historical data store 334 as gathered by an archive data agent 336. Through the CC interface 238 various data streams can be selected for archiving into the historical data store 334.

Components of the content distribution network 100 outside of the server 102 can also gather information that is reported to the server 102 in real-time, near real-time or along another time line. There is a defined API between those components and the server 102. Each type of information or variable collected by server 102 falls within a defined API or multiple APIs. In some cases, the CC interface 338 is used to define additional variables to modify an API that might be of use to processing subscribers. The additional variables can be passed to all processing subscribes or just a subset. For example, a component of the content distribution network 100 outside of the server 102 may report a user response but define an identifier of that user as a private variable that would not be passed to processing subscribers lacking access to that user and/or authorization to receive that user data. Processing subscribers having access to that user and/or authorization to receive that user data would receive the subscriber identifier along with response reported that component. Encryption and/or unique addressing of data streams or sub-streams can be used to hide the private variables within the messaging queues.

The user devices 106 and/or supervisor devices 110 communicate with the server 102 through security and/or integration hardware 410. The communication with security and/or integration hardware 410 can be encrypted or not. For example, a socket using a TCP connection could be used. In addition to TCP, other transport layer protocols like SCTP and UDP could be used in some embodiments to intake the gathered information. A protocol such as SSL could be used to protect the information over the TCP connection. Authentication and authorization can be performed to any user devices 106 and/or supervisor device interfacing to the server 102. The security and/or integration hardware 410 receives the information from one or several of the user devices 106 and/or the supervisor devices 110 by providing the API and any encryption, authorization, and/or authentication. In some cases, the security and/or integration hardware 410 reformats or rearranges this received information.

The messaging bus 412, also referred to herein as a messaging queue or a messaging channel, can receive information from the internal components of the server 102 and/or components of the content distribution network 100 outside of the server 102 and distribute the gathered information as a data stream to any processing subscribers that have requested the data stream from the messaging queue 412. As indicate in FIG. 4, processing subscribers are indicated by a connector to the messaging bus 412, the connector having an arrow head pointing away from the messaging bus 412. Only data streams within the messaging queue 412 that a particular processing subscriber has subscribed to may be read by that processing subscriber if received at all. Gathered information sent to the messaging queue 412 is processed and returned in a data stream in a fraction of a second by the messaging queue 412. Various multicasting and routing techniques can be used to distribute a data stream from the messaging queue 412 that a number of processing subscribers have requested. Protocols such as Multicast or multiple Unicast could be used to distribute streams within the messaging queue 412. Additionally, transport layer protocols like TCP, SCTP and UDP could be used in various embodiments.

Through the CC interface 338, an external or internal processing subscriber can be assigned one or more data streams within the messaging queue 412. A data stream is a particular type of message in a particular category. For example, a data stream can comprise all of the data reported to the messaging bus 412 by a designated set of components. One or more processing subscribers could subscribe and receive the data stream to process the information and make a decision and/or feed the output from the processing as gathered information fed back into the messaging queue 412. Through the CC interface 338 a developer can search the available data streams or specify a new data stream and its API. The new data stream might be determined by processing a number of existing data streams with a processing subscriber.

The CDN 110 has internal processing subscribers 402-408 that process assigned data streams to perform functions within the server 102. Internal processing subscribers 402-408 could perform functions such as providing content to a user, receiving a response from a user, determining the correctness of the received response, updating one or several models based on the correctness of the response, recommending new content for providing to one or several users, or the like. The internal processing subscribers 402-408 can decide filtering and weighting of records from the data stream. To the extent that decisions are made based upon analysis of the data stream, each data record is time stamped to reflect when the information was gathered such that additional credibility could be given to more recent results, for example. Other embodiments may filter out records in the data stream that are from an unreliable source or stale. For example, a particular contributor of information may prove to have less than optimal gathered information and that could be weighted very low or removed altogether.

Internal processing subscribers 402-408 may additionally process one or more data streams to provide different information to feed back into the messaging queue 412 to be part of a different data stream. For example, hundreds of user devices 106 could provide responses that are put into a data stream on the messaging queue 412. An internal processing subscriber 402-408 could receive the data stream and process it to determine the difficulty of one or several data packets provided to one or several users, and supply this information back onto the messaging queue 412 for possible use by other internal and external processing subscribers.

As mentioned above, the CC interface 338 allows the CDN 110 to query historical messaging queue 412 information. An archive data agent 336 listens to the messaging queue 412 to store data streams in a historical database 334. The historical database 334 may store data streams for varying amounts of time and may not store all data streams. Different data streams may be stored for different amounts of time.

With regard to the components 402-48, the content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a packet selection system 402. The packet selection system 402 may be implemented using dedicated hardware within the content distribution network 100 (e.g., a packet selection server 402), or using designated hardware and software resources within a shared content management server 102. In some embodiments, the packet selection system 402 may adjust the selection and adaptive capabilities of content resources to match the needs and desires of the users receiving the content. For example, the packet selection system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the packet selection system 402 may modify content resources for individual users.

In some embodiments, the packet selection system 402 can include a recommendation engine, also referred to herein as an adaptive recommendation engine. In some embodiments, the recommendation engine can select one or several pieces of content, also referred to herein as data packets, for providing to a user. These data packets can be selected based on, for example, the information retrieved from the database server 104 including, for example, the user profile database 301, the content library database 303, the model database 309, or the like. In some embodiments, these one or several data packets can be adaptively selected and/or selected according to one or several selection rules. In one embodiment, for example, the recommendation engine can retrieve information from the user profile database 301 identifying, for example, a skill level of the user. The recommendation engine can further retrieve information from the content library database 303 identifying, for example, potential data packets for providing to the user and the difficulty of those data packets and/or the skill level associated with those data packets.

The recommendation engine can identify one or several potential data packets for providing and/or one or several data packets for providing to the user based on, for example, one or several rules, models, predictions, or the like. The recommendation engine can use the skill level of the user to generate a prediction of the likelihood of one or several users providing a desired response to some or all of the potential data packets. In some embodiments, the recommendation engine can pair one or several data packets with selection criteria that may be used to determine which packet should be delivered to a student-user based on one or several received responses from that student-user. In some embodiments, one or several data packets can be eliminated from the pool of potential data packets if the prediction indicates either too high a likelihood of a desired response or too low a likelihood of a desired response. In some embodiments, the recommendation engine can then apply one or several selection criteria to the remaining potential data packets to select a data packet for providing to the user. These one or several selection criteria can be based on, for example, criteria relating to a desired estimated time for receipt of response to the data packet, one or several content parameters, one or several assignment parameters, or the like.

A content management server 102 also may include a summary model system 404. The summary model system 404 may be implemented using dedicated hardware within the content distribution network 100 (e.g., a summary model server 404), or using designated hardware and software resources within a shared content management server 102. In some embodiments, the summary model system 404 may monitor the progress of users through various types of content resources and groups, such as media compilations, courses or curriculums in training or educational contexts, interactive gaming environments, and the like. For example, the summary model system 404 may query one or more databases and/or data store servers 104 to retrieve user data such as associated content compilations or programs, content completion status, user goals, results, and the like.

A content management server 102 also may include a response system 406, which can include, in some embodiments, a response processor. The response system 406 may be implemented using dedicated hardware within the content distribution network 100 (e.g., a response server 406), or using designated hardware and software resources within a shared content management server 102. The response system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the response server 406 may analyze the information to determine the effectiveness or appropriateness of content resources with, for example, a subject matter, an age group, a skill level, or the like. In some embodiments, the response system 406 may provide updates to the packet selection system 402 or the summary model system 404, with the attributes of one or more content resources or groups of resources within the network 100. The response system 406 also may receive and analyze user evaluation data from user devices 106, supervisor devices 110, and administrator servers 116, etc. For instance, response system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

In some embodiments, the response system 406 can be further configured to receive one or several responses from the user and analyze these one or several responses. In some embodiments, for example, the response system 406 can be configured to translate the one or several responses into one or several observables. As used herein, an observable is a characterization of a received response. In some embodiments, the translation of the one or several responses into one or several observables can include determining whether the one or several responses are correct responses, also referred to herein as desired responses, or are incorrect responses, also referred to herein as undesired responses. In some embodiments, the translation of the one or several responses into one or several observables can include characterizing the degree to which one or several responses are desired responses and/or undesired responses. In some embodiments, one or several values can be generated by the response system 406 to reflect user performance in responding to the one or several data packets. In some embodiments, these one or several values can comprise one or several scores for one or several responses and/or data packets.

A content management server 102 also may include a presentation system 408. The presentation system 408 may be implemented using dedicated hardware within the content distribution network 100 (e.g., a presentation server 408), or using designated hardware and software resources within a shared content management server 102. The presentation system 408 can include a presentation engine that can be, for example, a software module running on the content delivery system.

The presentation system 408, also referred to herein as the presentation module or the presentation engine, may receive content resources from the packet selection system 402 and/or from the summary model system 404, and provide the resources to user devices 106. The presentation system 408 may determine the appropriate presentation format for the content resources based on the user characteristics and preferences, and/or the device capabilities of user devices 106. If needed, the presentation system 408 may convert the content resources to the appropriate presentation format and/or compress the content before transmission. In some embodiments, the presentation system 408 may also determine the appropriate transmission media and communication protocols for transmission of the content resources.

In some embodiments, the presentation system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
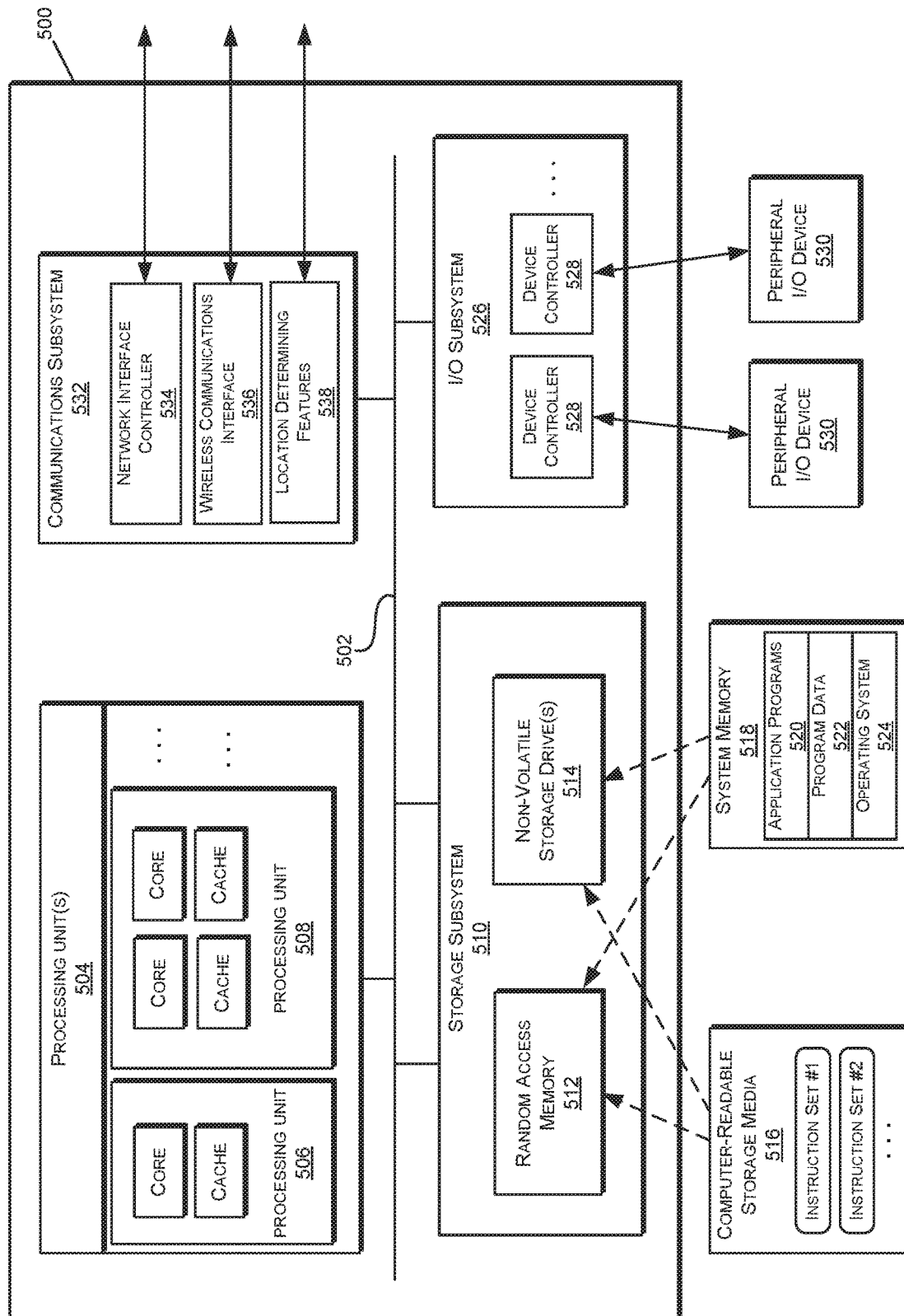
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater).

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to the user in perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.). The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that, when executed by a processor, provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 311). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
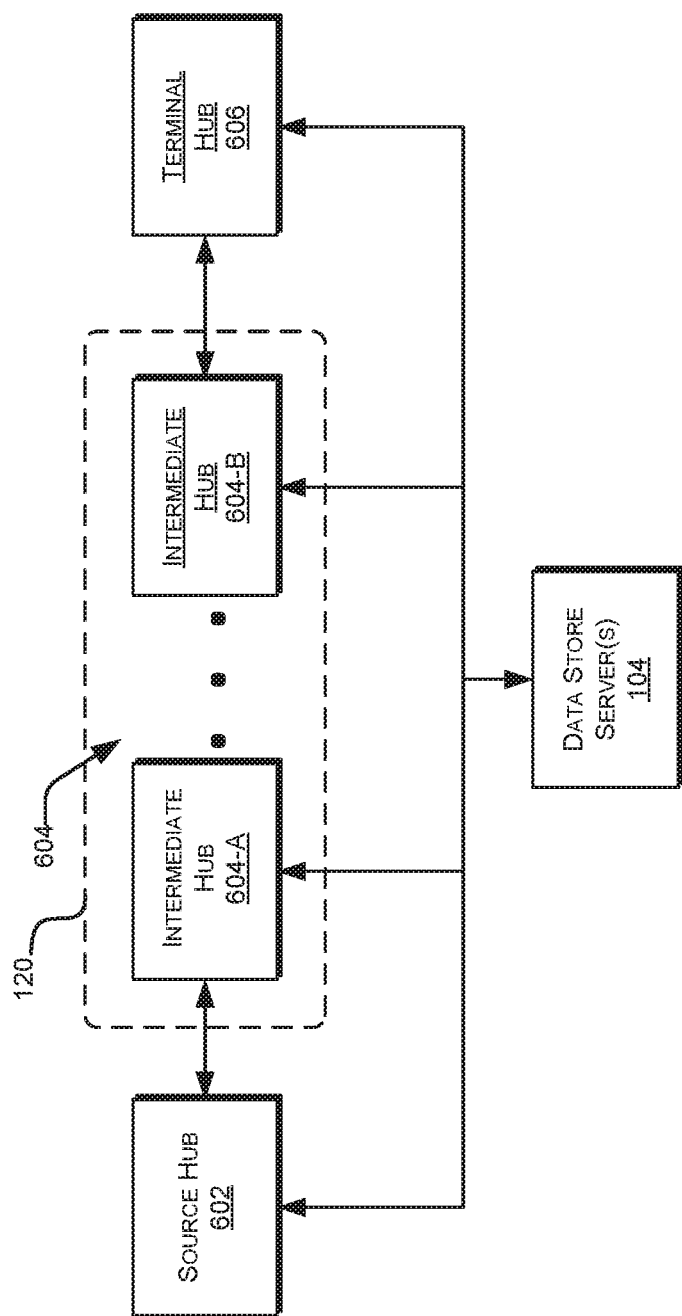
FIG. 6 is a block diagram illustrating one embodiment of the communication network.

With reference now to FIG. 6, a block diagram illustrating one embodiment of the communication network is shown. Specifically, FIG. 6 depicts one hardware configuration in which messages are exchanged between a source hub 602 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatingly connected with the data store 104. In such an embodiments, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
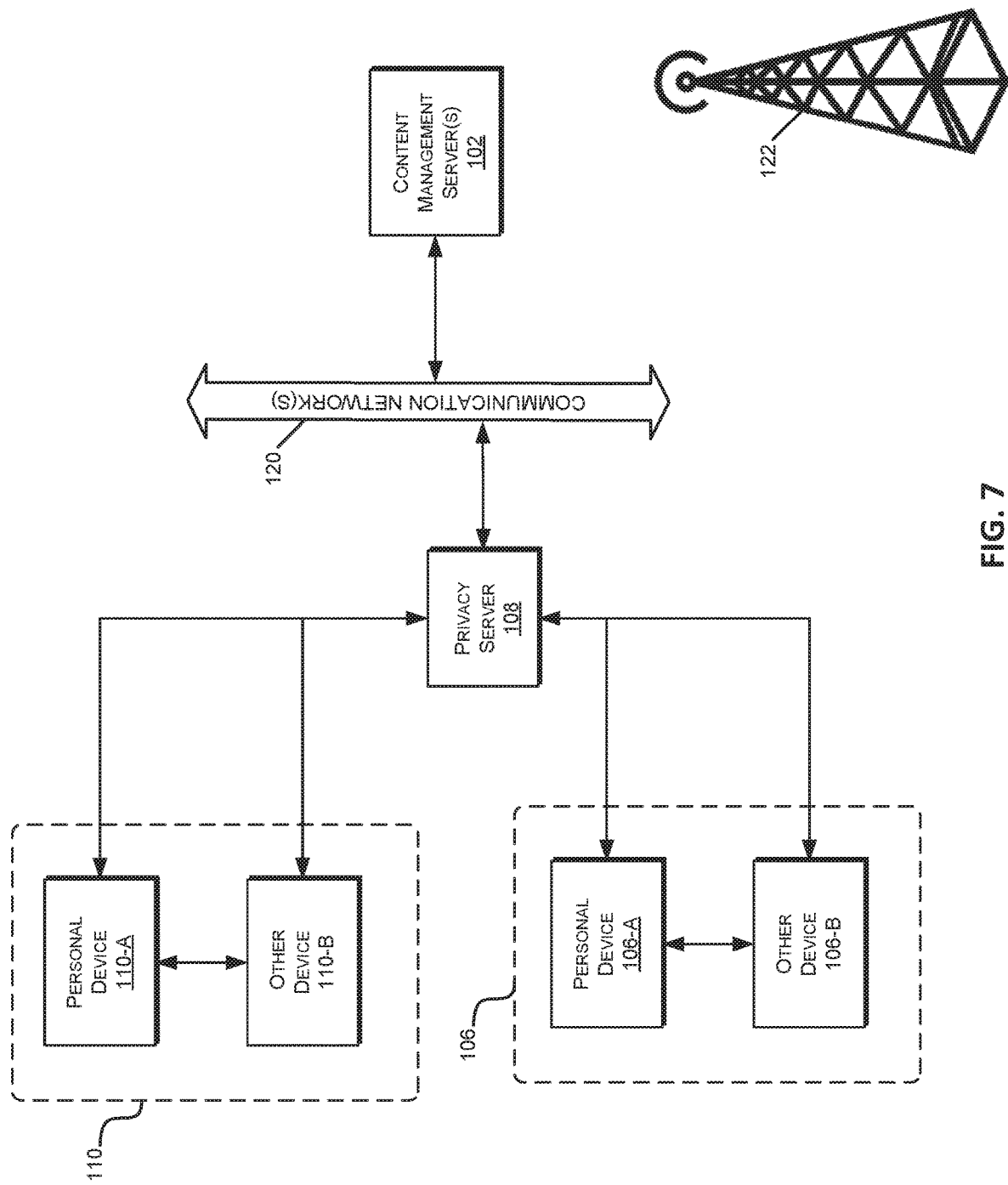
FIG. 7 is a block diagram illustrating one embodiment of user device and supervisor device communication.

With reference now to FIG. 7, a block diagram illustrating one embodiment of user device 106 and supervisor device 110 communication is shown. In some embodiments, for example, a user may have multiple devices that can connect with the content distribution network 100 to send or receive information. In some embodiments, for example, a user may have a personal device such as a mobile device, a Smartphone, a tablet, a Smartwatch, a laptop, a PC, or the like. In some embodiments, the other device can be any computing device in addition to the personal device. This other device can include, for example, a laptop, a PC, a Smartphone, a tablet, a Smartwatch, or the like. In some embodiments, the other device differs from the personal device in that the personal device is registered as such within the content distribution network 100 and the other device is not registered as a personal device within the content distribution network 100.

Specifically with respect to FIG. 7, the user device 106 can include a personal user device 106-A and one or several other user devices 106-B. In some embodiments, one or both of the personal user device 106-A and the one or several other user devices 106-B can be communicatingly connected to the content management server 102 and/or to the navigation system 122. Similarly, the supervisor device 110 can include a personal supervisor device 110-A and one or several other supervisor devices 110-B. In some embodiments, one or both of the personal supervisor device 110-A and the one or several other supervisor devices 110-B can be communicatingly connected to the content management server 102 and/or to the navigation system 122.

In some embodiments, the content distribution network can send one or more alerts to one or more user devices 106 and/or one or more supervisor devices 110 via, for example, the communication network 120. In some embodiments, the receipt of the alert can result in the launching of an application within the receiving device, and in some embodiments, the alert can include a link that, when selected, launches the application or navigates a web-browser of the device of the selector of the link to a page or portal associated with the alert.

In some embodiments, for example, the providing of this alert can include the identification of one or several user devices 106 and/or student-user accounts associated with the student-user and/or one or several supervisor devices 110 and/or supervisor-user accounts associated with the supervisor-user. After these one or several devices 106, 110 and/or accounts have been identified, the providing of this alert can include determining an active device of the devices 106, 110 based on determining which of the devices 106, 110 and/or accounts are actively being used, and then providing the alert to that active device.

Specifically, if the user is actively using one of the devices 106, 110 such as the other user device 106-B and the other supervisor device 110-B, and/or accounts, the alert can be provided to the user via that other device 106-B, 110-B and/or account that is actively being used. If the user is not actively using an other device 106-B, 110-B and/or account, a personal device 106-A, 110-A device, such as a smart phone or tablet, can be identified and the alert can be provided to this personal device 106-A, 110-A. In some embodiments, the alert can include code to direct the default device to provide an indicator of the received alert such as, for example, an aural, tactile, or visual indicator of receipt of the alert.

In some embodiments, the recipient device 106, 110 of the alert can provide an indication of receipt of the alert. In some embodiments, the presentation of the alert can include the control of the I/O subsystem 526 to, for example, provide an aural, tactile, and/or visual indicator of the alert and/or of the receipt of the alert. In some embodiments, this can include controlling a screen of the supervisor device 110 to display the alert, data contained in alert and/or an indicator of the alert.

Figure 8:
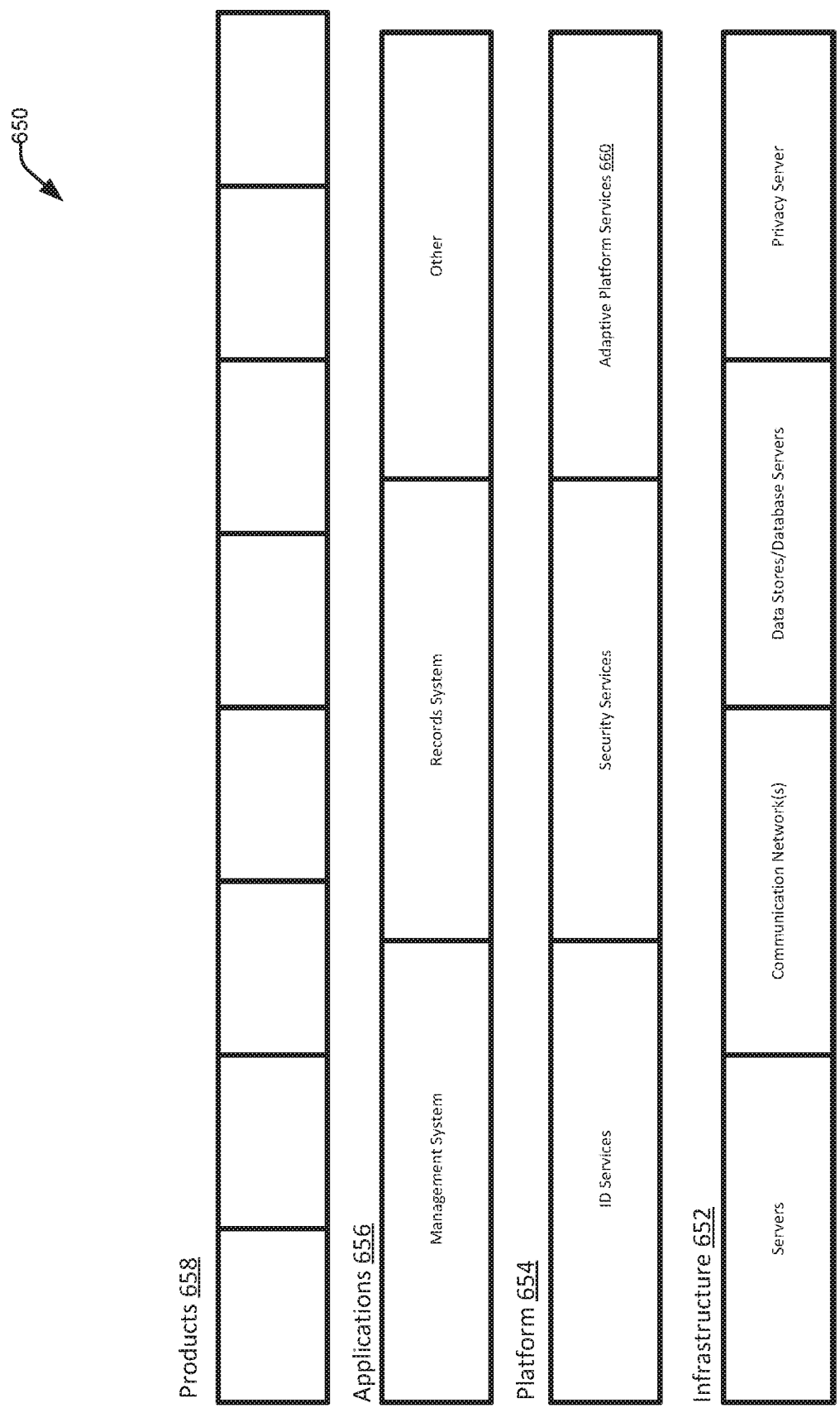
FIG. 8 is a schematic illustration of one embodiment of a computing stack.

With reference now to FIG. 8, a schematic illustration of one embodiment of an application stack, and particularly of a stack 650 is shown. In some embodiments, the content distribution network 100 can comprise a portion of the stack 650 that can include an infrastructure layer 652, a platform layer 654, an applications layer 656, and a products layer 658. In some embodiments, the stack 650 can comprise some or all of the layers, hardware, and/or software to provide one or several desired functionalities and/or productions.

As depicted in FIG. 8, the infrastructure layer 652 can include one or several servers, communication networks, data stores, privacy servers, and the like. In some embodiments, the infrastructure layer can further include one or several user devices 106 and/or supervisor devices 110 connected as part of the content distribution network.

The platform layer can include one or several platform software programs, modules, and/or capabilities. These can include, for example, identification services, security services, and/or adaptive platform services 660. In some embodiments, the identification services can, for example, identify one or several users, components of the content distribution network 100, or the like. The security services can monitor the content distribution network for one or several security threats, breaches, viruses, malware, or the like. The adaptive platform services 660 can receive information from one or several components of the content distribution network 100 and can provide predictions, models, recommendations, or the like based on that received information. The functionality of the adaptive platform services 660 will be discussed in greater detail in FIGS. 9A-9C, below.

The applications layer 656 can include software or software modules upon or in which one or several product softwares or product software modules can operate. In some embodiments, the applications layer 656 can include, for example, a management system, record system, or the like. In some embodiments, the management system can include, for example, a Learning Management System (LMS), a Content Management System (CMS), or the like. The management system can be configured to control the delivery of one or several resources to a user and/or to receive one or several responses from the user. In some embodiments, the records system can include, for example, a virtual gradebook, a virtual counselor, or the like.

The products layer can include one or several software products and/or software module products. These software products and/or software module products can provide one or several services and/or functionalities to one or several users of the software products and/or software module products.

Figure 9B:
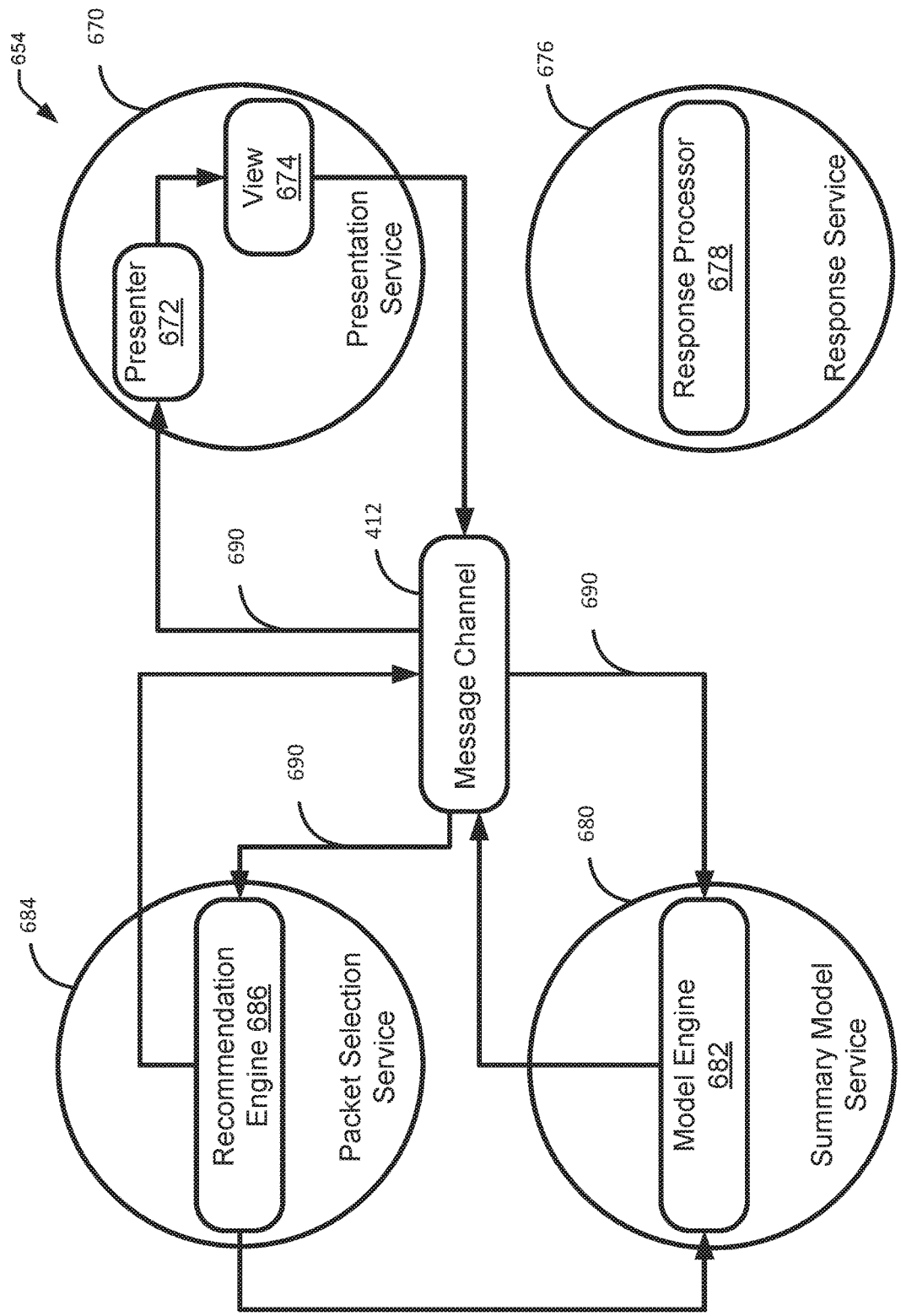
FIG. 9B is a schematic illustration of another embodiment of communication and processing flow of modules within the content distribution network.
Figure 9C:
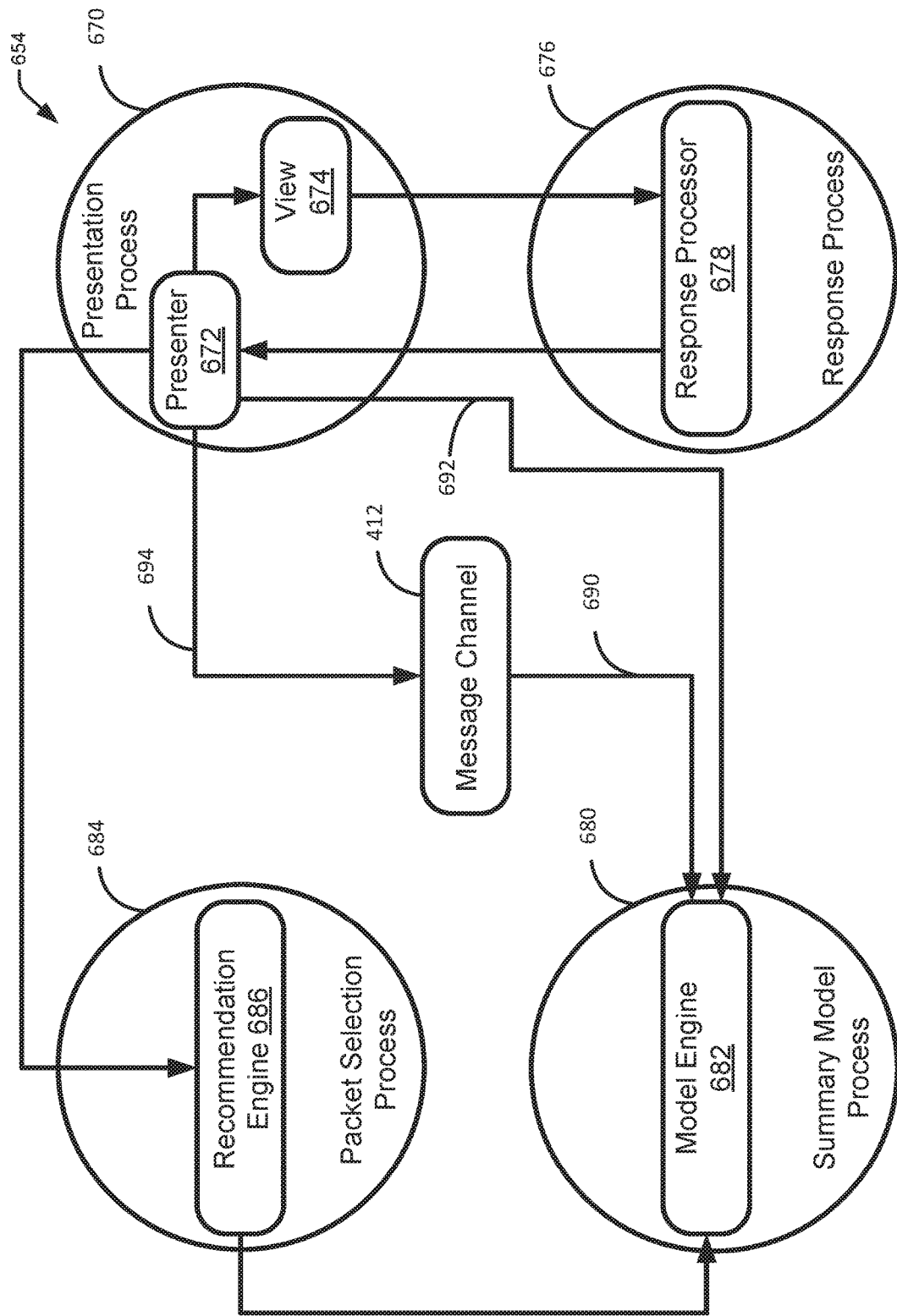
FIG. 9C is a schematic illustration of another embodiment of communication and processing flow of modules within the content distribution network.

With reference now to FIG. 9A-9C, schematic illustrations of embodiments of communication and processing flow of modules within the content distribution network 100 are shown. In some embodiments, the communication and processing can be performed in portions of the platform layer 654 and/or applications layer 656. FIG. 9A depicts a first embodiment of such communications or processing that can be in the platform layer 654 and/or applications layer 656 via the message channel 412.

The platform layer 654 and/or applications layer 656 can include a plurality of modules that can be embodied in software or hardware. In some embodiments, some or all of the modules can be embodied in hardware and/or software at a single location, and in some embodiments, some or all of these modules can be embodied in hardware and/or software at multiple locations. These modules can perform one or several processes including, for example, a presentation process 670, a response process 676, a summary model process 680, and a packet selection process 684.

The presentation process 670 can, in some embodiments, include one or several methods and/or steps to deliver content to one or several user devices 106 and/or supervisor devices 110. The presentation process 670 can be performed by a presenter module 672 and a view module 674. The presenter module 672 can be a hardware or software module of the content distribution network 100, and specifically of the server 102. In some embodiments, the presenter module 672 can include one or several portions, features, and/or functionalities that are located on the server 102 and/or one or several portions, features, and/or functionalities that are located on the user device 106. In some embodiments, the presenter module 672 can be embodied in the presentation system 408.

The presenter module 672 can control the providing of content to one or several user devices 106 and/or supervisor devices 110. Specifically, the presenter module 672 can control the generation of one or several messages to provide content to one or several desired user devices 106 and/or supervisor devices 110. The presenter module 672 can further control the providing of these one or several messages to the desired one or several desired user devices 106 and/or supervisor devices 110. Thus, in some embodiments, the presenter module 672 can control one or several features of the communications subsystem 532 to generate and send one or several electrical signals comprising content to one or several user devices 106 and/or supervisor devices 110.

In some embodiments, the presenter module 672 can control and/or manage a portion of the presentation functions of the presentation process 670, and can specifically manage an "outer loop" of presentation functions. As used herein, the outer loop refers to tasks relating to the tracking of a user's progress through all or a portion of a group of data packets. In some embodiments, this can include the identification of one or several completed data packets or nodes and/or the non-adaptive selection of one or several next data packets or nodes according to, for example, one or several fixed rules. Such non-adaptive selection does not rely on the use of predictive models, but rather on rules identifying next data packets based on data relating to the completion of one or several previously completed data packets or assessments and/or whether one or several previously completed data packets were successfully completed.

In some embodiments, and due to the management of the outer loop of presentation functions including the non-adaptive selection of one or several next data packets, nodes, or tasks by the presenter module, the presenter module can function as a recommendation engine referred to herein as a first recommendation engine or a rules-based recommendation engine. In some embodiments, the first recommendation engine can be configured to select a next node for a user based on one or all of: the user's current location in the content network; potential next nodes; the user's history including the user's previous responses; and one or several guard conditions associated with the potential next nodes. In some embodiments, a guard condition defines one or several prerequisites for entry into, or exit from, a node.

In some embodiments, the presenter module 672 can include a portion located on the server 102 and/or a portion located on the user device 106. In some embodiments, the portion of the presenter module 672 located on the server 102 can receive data packet information and provide a subset of the received data packet information to the portion of the presenter module 672 located on the user device 106. In some embodiments, this segregation of functions and/or capabilities can prevent solution data from being located on the user device 106 and from being potentially accessible by the user of the user device 106.

In some embodiments, the portion of the presenter module 672 located on the user device 106 can be further configured to receive the subset of the data packet information from the portion of the presenter module 672 located on the server 102 and provide that subset of the data packet information to the view module 674. In some embodiments, the portion of the presenter module 672 located on the user device 106 can be further configured to receive a content request from the view module 674 and to provide that content request to the portion of the presenter module 674 located on the server 102.

The view module 674 can be a hardware or software module of some or all of the user devices 106 and/or supervisor devices 110 of the content distribution network 100. The view module 674 can receive one or several electrical signals and/or communications from the presenter module 672 and can provide the content received in those one or several electrical signals and/or communications to the user of the user device 106 and/or supervisor device 110 via, for example, the I/O subsystem 526.

In some embodiments, the view module 674 can control and/or monitor an "inner loop" of presentation functions. As used herein, the inner loop refers to tasks relating to the tracking and/or management of a user's progress through a data packet. This can specifically relate to the tracking and/or management of a user's progression through one or several pieces of content, questions, assessments, and/or the like of a data packet. In some embodiments, this can further include the selection of one or several next pieces of content, next questions, next assessments, and/or the like of the data packet for presentation and/or providing to the user of the user device 106.

In some embodiments, one or both of the presenter module 672 and the view module 674 can comprise one or several presentation engines. In some embodiments, these one or several presentation engines can comprise different capabilities and/or functions. In some embodiments, one of the presentation engines can be configured to track the progress of a user through a single data packet, task, content item, or the like, and in some embodiments, one of the presentation engines can track the progress of a user through a series of data packets, tasks, content items, or the like.

The response process 676 can comprise one or several methods and/or steps to evaluate a response. In some embodiments, this can include, for example, determining whether the response comprises a desired response and/or an undesired response. In some embodiments, the response process 676 can include one or several methods and/or steps to determine the correctness and/or incorrectness of one or several received responses. In some embodiments, this can include, for example, determining the correctness and/or incorrectness of a multiple choice response, a true/false response, a short answer response, an essay response, or the like. In some embodiments, the response processor can employ, for example, natural language processing, semantic analysis, or the like in determining the correctness or incorrectness of the received responses.

In some embodiments, the response process 676 can be performed by a response processor 678. The response processor 678 can be a hardware or software module of the content distribution network 100, and specifically of the server 102. In some embodiments, the response processor 678 can be embodied in the response system 406. In some embodiments, the response processor 678 can be communicatingly connected to one or more of the modules of the presentation process 760 such as, for example, the presenter module 672 and/or the view module 674. In some embodiments, the response processor 678 can be communicatingly connected with, for example, the message channel 412 and/or other components and/or modules of the content distribution network 100.

The summary model process 680 can comprise one or several methods and/or steps to generate and/or update one or several models. In some embodiments, this can include, for example, implementing information received either directly or indirectly from the response processor 678 to update one or several models. In some embodiments, the summary model process 680 can include the update of a model relating to one or several user attributes such as, for example, a user skill model, a user knowledge model, a learning style model, or the like. In some embodiments, the summary model process 680 can include the update of a model relating to one or several content attributes including attributes relating to a single content item and/or data packet and/or attributes relating to a plurality of content items and/or data packets. In some embodiments, these models can relate to an attribute of the one or several data packets such as, for example, difficulty, discrimination, required time, or the like.

In some embodiments, the summary model process 680 can be performed by the model engine 682. In some embodiments, the model engine 682 can be a hardware or software module of the content distribution network 100, and specifically of the server 102. In some embodiments, the model engine 682 can be embodied in the summary model system 404.

In some embodiments, the model engine 682 can be communicatingly connected to one or more of the modules of the presentation process 760 such as, for example, the presenter module 672 and/or the view module 674, can be connected to the response processor 678 and/or the recommendation. In some embodiment, the model engine 682 can be communicatingly connected to the message channel 412 and/or other components and/or modules of the content distribution network 100.

The packet selection process 684 can comprise one or several steps and/or methods to identify and/or select a data packet for presentation to a user. In some embodiments, this data packet can comprise a plurality of data packets. In some embodiments, this data packet can be selected according to one or several models updated as part of the summary model process 680. In some embodiments, this data packet can be selected according to one or several rules, probabilities, models, or the like. In some embodiments, the one or several data packets can be selected by the combination of a plurality of models updated in the summary model process 680 by the model engine 682. In some embodiments, these one or several data packets can be selected by a recommendation engine 686. The recommendation engine 686 can be a hardware or software module of the content distribution network 100, and specifically of the server 102. In some embodiments, the recommendation engine 686 can be embodied in the packet selection system 402. In some embodiments, the recommendation engine 686 can be communicatingly connected to one or more of the modules of the presentation process 670, the response process 676, and/or the summary model process 680 either directly and/or indirectly via, for example, the message channel.

In some embodiments, and as depicted in FIG. 9A, a presenter module 672 can receive a data packet for presentation to a user device 106. This data packet can be received, either directly or indirectly from a recommendation engine 686. In some embodiments, for example, the presenter module 672 can receive a data packet for providing to a user device 106 from the recommendation engine 686, and in some embodiments, the presenter module 672 can receive an identifier of a data packet for providing to a user device 106 via a view module 674. This can be received from the recommendation engine 686 via a message channel 412. Specifically, in some embodiments, the recommendation engine 686 can provide data to the message channel 412 indicating the identification and/or selection of a data packet for providing to a user via a user device 106. In some embodiments, this data indicating the identification and/or selection of the data packet can identify the data packet and/or can identify the intended recipient of the data packet.

The message channel 412 can output this received data in the form of a data stream 690 which can be received by, for example, the presenter module 672, the model engine 682, and/or the recommendation engine 686. In some embodiments, some or all of: the presenter module 672, the model engine 682, and/or the recommendation engine 686 can be configured to parse and/or filter the data stream 690 to identify data and/or events relevant to their operation. Thus, for example, the presenter module 672 can be configured to parse the data stream for information and/or events relevant to the operation of the presenter module 672.

In some embodiments, the presenter module 672 can extract the data packet from the data stream 690 and/or extract data identifying the data packet and/or indicating the selecting of a data packet from the data stream. In the event that data identifying the data packet is extracted from the data stream 690, the presenter module 672 can request and receive the data packet from the database server 104, and specifically from the content library database 303. In embodiments in which data indicating the selection of a data packet is extracted from the data stream 690, the presenter module 672 can request and receive identification of the data packet from the recommendation engine 686 and then request and receive the data packet from the database server 104, and specifically from the content library database 303, and in some embodiments in which data indicating the selection of a data packet is extracted from the data stream 690, the presenter module 672 can request and receive the data packet from the recommendation engine 686.

The presenter module can then provide the data packet and/or portions of the data packet to the view module 674. In some embodiments, for example, the presenter module 672 can retrieve one or several rules and/or conditions that can be, for example, associated with the data packet and/or stored in the database server 104. In some embodiments, these rules and/or conditions can identify portions of a data packet for providing to the view module 674 and/or portions of a data packet to not provide to the view module 674. In some embodiments, for example, sensitive portions of a data packet, such as, for example, solution information to any questions associated with a data packet, is not provided to the view module 674 to prevent the possibility of undesired access to those sensitive portions of the data packet. Thus, in some embodiments, the one or several rules and/or conditions can identify portions of the data packet for providing to the view module 674 and/or portions of the data packet for not providing to the view module.

In some embodiments, the presenter module 672 can, according to the one or more rules and/or conditions, generate and transmit an electronic message containing all or portions of the data packet to the view module 674. The view module 674 can receive these all or portions of the data packet and can provide all or portions of this information to the user of the user device 106 associated with the view module 674 via, for example, the I/O subsystem 526. In some embodiments, as part of the providing of all or portions of the data packet to the user of the view module 674, one or several user responses can be received by the view module 674. In some embodiments, these one or several user responses can be received via the I/O subsystem 526 of the user device 106.

After one or several user responses have been received, the view module 674 can provide the one or several user responses to the response processor 678. In some embodiments, these one or several responses can be directly provided to the response processor 678, and in some embodiments, these one or several responses can be provided indirectly to the response processor 678 via the message channel 412.

After the response processor 678 receives the one or several responses, the response processor 678 can determine whether the responses are desired responses and/or the degree to which the received responses are desired responses. In some embodiments, the response processor can make this determination via, for example, use of one or several techniques, including, for example, natural language processing (NLP), semantic analysis, or the like.

In some embodiments, the response processor can determine whether a response is a desired response and/or the degree to which a response is a desired response with comparative data which can be associated with the data packet. In some embodiments, this comparative data can comprise, for example, an indication of a desired response and/or an indication of one or several undesired responses, a response key, a response rubric comprising one criterion or several criteria for determining the degree to which a response is a desired response, or the like. In some embodiments, the comparative data can be received as a portion of and/or associated with a data packet. In some embodiments, the comparative data can be received by the response processor 678 from the presenter module 672 and/or from the message channel 412. In some embodiments, the response data received from the view module 674 can comprise data identifying the user and/or the data packet or portion of the data packet with which the response is associated. In some embodiments in which the response processor 678 merely receives data identifying the data packet and/or portion of the data packet associated with the one or several responses, the response processor 678 can request and/or receive comparative data from the database server 104, and specifically from the content library database 303 of the database server 104.

After the comparative data has been received, the response processor 678 determines whether the one or several responses comprise desired responses and/or the degree to which the one or several responses comprise desired responses. The response processor can then provide the data characterizing whether the one or several responses comprise desired response and/or the degree to which the one or several responses comprises desired responses to the message channel 412. The message channel can, as discussed above, include the output of the response processor 678 in the data stream 690 which can be constantly output by the message channel 412.

In some embodiments, the model engine 682 can subscribe to the data stream 690 of the message channel 412 and can thus receive the data stream 690 of the message channel 412 as indicated in FIG. 9A. The model engine 682 can monitor the data stream 690 to identify data and/or events relevant to the operation of the model engine. In some embodiments, the model engine 682 can monitor the data stream 690 to identify data and/or events relevant to the determination of whether a response is a desired response and/or the degree to which a response is a desired response.

When a relevant event and/or relevant data are identified by the model engine, the model engine 682 can take the identified relevant event and/or relevant data and modify one or several models. In some embodiments, this can include updating and/or modifying one or several models relevant to the user who provided the responses, updating and/or modifying one or several models relevant to the data packet associated with the responses, and/or the like. In some embodiments, these models can be retrieved from the database server 104, and, in some embodiments, can be retrieved from the model data source 309 of the database server 104.

After the models have been updated, the updated models can be stored in the database server 104. In some embodiments, the model engine 682 can send data indicative of the event of the completion of the model update to the message channel 412. The message channel 412 can incorporate this information into the data stream 690 which can be received by the recommendation engine 686. The recommendation engine 686 can monitor the data stream 690 to identify data and/or events relevant to the operation of the recommendation engine 686. In some embodiments, the recommendation engine 686 can monitor the data stream 690 to identify data and/or events relevant to the updating of one or several models by the model engine 682.

When the recommendation engine 686 identifies information in the data stream 690 indicating the completion of the summary model process 680 for models relevant to the user providing the response and/or for models relevant to the data packet provided to the user, the recommendation engine 686 can identify and/or select a next data packet for providing to the user and/or to the presentation process 470. In some embodiments, this selection of the next data packet can be performed according to one or several rules and/or conditions. After the next data packet has been selected, the recommendation engine 686 can provide information to the model engine 682 identifying the next selected data packet and/or to the message channel 412 indicating the event of the selection of the next content item. After the message channel 412 receives information identifying the selection of the next content item and/or receives the next content item, the message channel 412 can include this information in the data stream 690 and the process discussed with respect to FIG. 9A can be repeated.

With reference now to FIG. 9B, a schematic illustration of a second embodiment of communication or processing that can be in the platform layer 654 and/or applications layer 656 via the message channel 412 is shown. In the embodiment depicted in FIG. 9B, the data packet provided to the presenter module 672 and then to the view module 674 does not include a prompt for a user response and/or does not result in the receipt of a user response. As no response is received, when the data packet is completed, nothing is provided to the response processor 678, but rather data indicating the completion of the data packet is provided from one of the view module 674 and/or the presenter module 672 to the message channel 412. The data is then included in the data stream 690 and is received by the model engine 682 which uses the data to update one or several models. After the model engine 682 has updated the one or several models, the model engine 682 provides data indicating the completion of the model updates to the message channel 412. The message channel 412 then includes the data indicating the completion of the model updates in the data stream 690 and the recommendation engine 686, which can subscribe to the data stream 690, can extract the data indicating the completion of the model updates from the data stream 690. The recommendation engine 686 can then identify a next one or several data packets for providing to the presenter module 672, and the recommendation engine 686 can then, either directly or indirectly, provide the next one or several data packets to the presenter module 672.

With reference now to FIG. 9C, a schematic illustration of an embodiment of dual communication, or hybrid communication, in the platform layer 654 and/or applications layer 656 is shown. Specifically, in this embodiment, some communication is synchronous with the completion of one or several tasks and some communication is asynchronous. Thus, in the embodiment depicted in FIG. 9C, the presenter module 972 communicates synchronously with the model engine 682 via a direct communication 692 and communicates asynchronously with the model engine 682 via the message channel 412.

Specifically, and with reference to FIG. 9C, the presenter module 672 can receive and/or select a data packet for presentation to the user device 106 via the view module 674. In some embodiments, the presenter module 672 can identify all or portions of the data packet that can be provided to the view module 674 and portions of the data packet for retaining from the view module 674. In some embodiments, the presenter module can provide all or portions of the data packet to the view module 674. In some embodiments, and in response to the receipt of all or portions of the data packet, the view module 674 can provide a confirmation of receipt of the all or portions of the data packet and can provide those all or portions of the data packet to the user via the user device 106. In some embodiments, the view module 674 can provide those all or portions of the data packet to the user device 106 while controlling the inner loop of the presentation of the data packet to the user via the user device 106.

After those all or portions of the data packet have been provided to the user device 106, a response indicative of the completion of one or several tasks associated with the data packet can be received by the view module 674 from the user device 106, and specifically from the I/O subsystem 526 of the user device 106. In response to this receive, the view module 674 can provide an indication of this completion status to the presenter module 672 and/or can provide the response to the response processor 678.

After the response has been received by the response processor 678, the response processor 678 can determine whether the received response is a desired response. In some embodiments, this can include, for example, determining whether the response comprises a correct answer and/or the degree to which the response comprises a correct answer.

After the response processor has determined whether the received response is a desired response, the response processor 678 can provide an indicator of the result of the determination of whether the received response is a desired response to the presenter module 672. In response to the receipt of the indicator of whether the result of the determination of whether the received response is a desired response, the presenter module 672 can synchronously communicate with the model engine 682 via a direct communication 692 and can asynchronously communicate with model engine 682 via the message channel 412. In some embodiments, the synchronous communication can advantageously include two-way communication between the model engine 682 and the presenter module 672 such that the model engine 682 can provide an indication to the presenter module 672 when model updating is completed by the model engine.

After the model engine 682 has received one or both of the synchronous and asynchronous communications, the model engine 682 can update one or several models relating to, for example, the user, the data packet, or the like. After the model engine 682 has completed the updating of the one or several models, the model engine 682 can send a communication to the presenter module 672 indicating the completion of the updated one or several modules.

After the presenter module 672 receives the communication indicating the completion of the updating of the one or several models, the presenter module 672 can send a communication to the recommendation engine 686 requesting identification of a next data packet. As discussed above, the recommendation engine 686 can then retrieve the updated model and retrieve the user information. With the updated models and the user information, the recommendation engine can identify a next data packet for providing to the user, and can provide the data packet to the presenter module 672. In some embodiments, the recommendation engine 686 can further provide an indication of the next data packet to the model engine 682, which can use this information relating to the next data packet to update one or several models, either immediately, or after receiving a communication from the presenter module 672 subsequent to the determination of whether a received response for that data packet is a desired response.

Figure 9D:
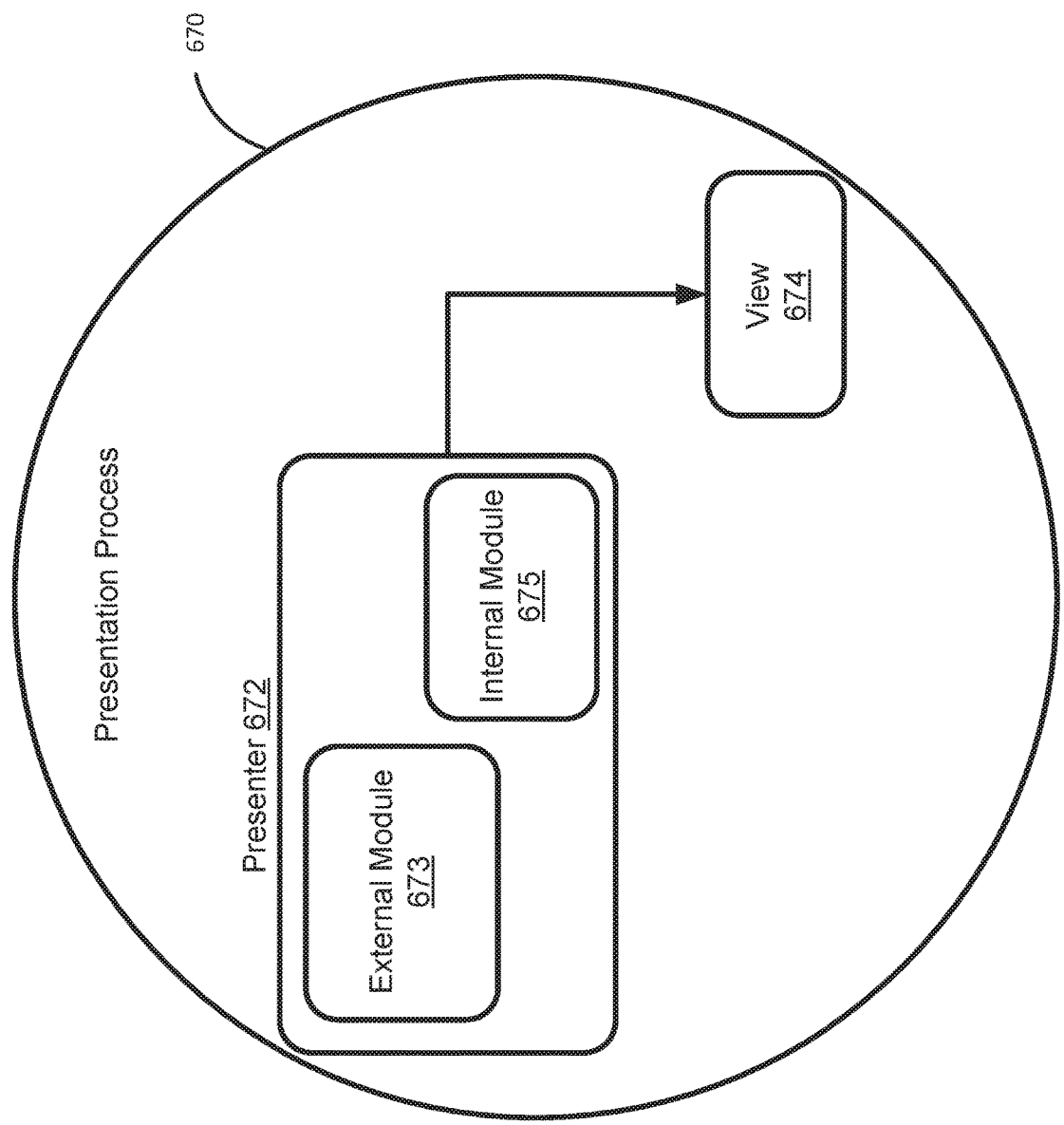
FIG. 9D is a schematic illustration of one embodiment of the presentation process.

With reference now to FIG. 9D, a schematic illustration of one embodiment of the presentation process 670 is shown. Specifically, FIG. 9D depicts multiple portions of the presenter module 672, namely, the external portion 673 and the internal portion 675. In some embodiments, the external portion 673 of the presenter module 672 can be located in the server, and in some embodiments, the internal portion 675 of the presenter module 672 can be located in the user device 106. In some embodiments, the external portion 673 of the presenter module can be configured to communicate and/or exchange data with the internal portion 675 of the presenter module 672 as discussed herein. In some embodiments, for example, the external portion 673 of the presenter module 672 can receive a data packet and can parse the data packet into portions for providing to the internal portion 675 of the presenter module 672 and portions for not providing to the internal portion 675 of the presenter module 672. In some embodiments, the external portion 673 of the presenter module 672 can receive a request for additional data and/or an additional data packet from the internal portion 675 of the presenter module 672. In such an embodiment, the external portion 673 of the presenter module 672 can identify and retrieve the requested data and/or the additional data packet from, for example, the database server 104 and more specifically from the content library database 104.

Figure 10A:
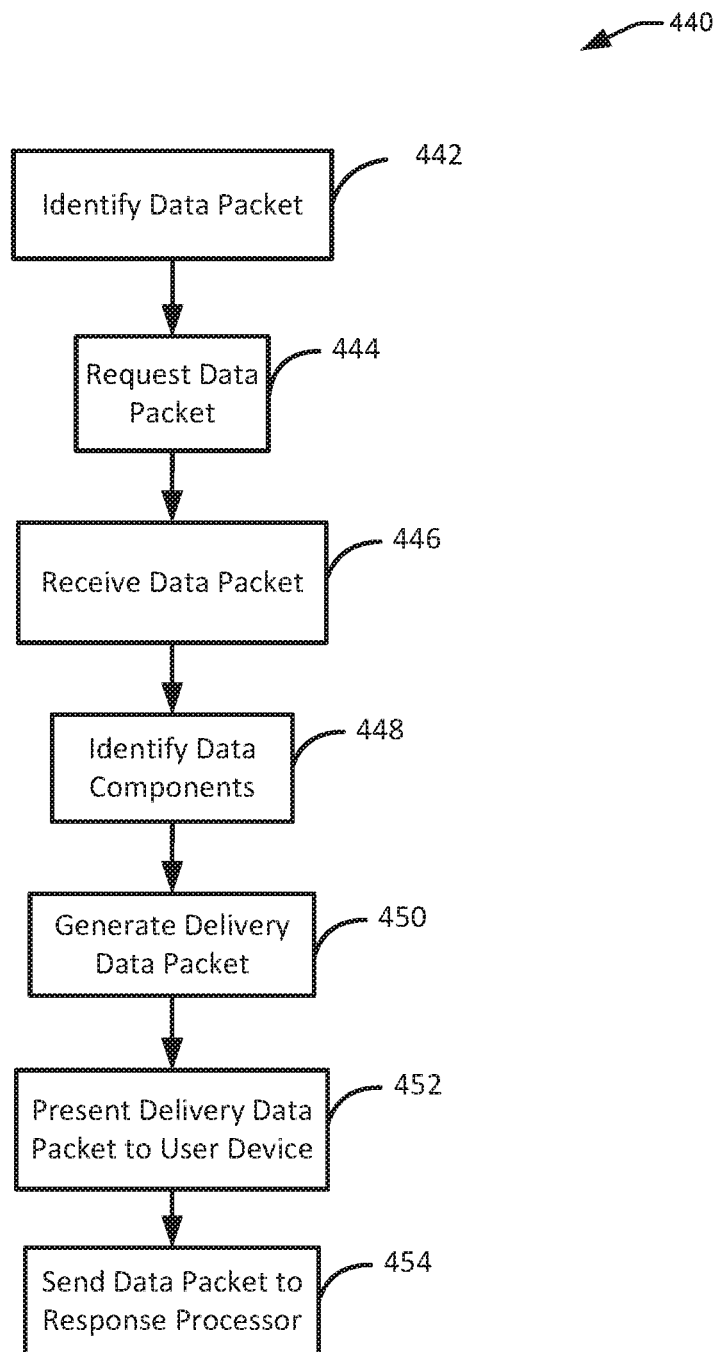
FIG. 10A is a flowchart illustrating one embodiment of a process for data management.

With reference now to FIG. 10A, a flowchart illustrating one embodiment of a process 440 for data management is shown. In some embodiments, the process 440 can be performed by the content management server 102, and more specifically by the presentation system 408 and/or by the presentation module or presentation engine. In some embodiments, the process 440 can be performed as part of the presentation process 670.

The process 440 begins at block 442, wherein a data packet is identified. In some embodiments, the data packet can be a data packet for providing to a student-user. In some embodiments, the data packet can be identified based on a communication received either directly or indirectly from the recommendation engine 686.

After the data packet has been identified, the process 440 proceeds to block 444, wherein the data packet is requested. In some embodiments, this can include the requesting of information relating to the data packet such as the data forming the data packet. In some embodiments, this information can be requested from, for example, the content library database 303. After the data packet has been requested, the process 440 proceeds to block 446, wherein the data packet is received. In some embodiments, the data packet can be received by the presentation system 408 from, for example, the content library database 303.

After the data packet has been received, the process 440 proceeds to block 448, wherein one or several data components are identified. In some embodiments, for example, the data packet can include one or several data components which can, for example, contain different data. In some embodiments, one of these data components, referred to herein as a presentation component, can include content for providing to the student user, which content can include one or several requests and/or questions and/or the like. In some embodiments, one of these data components, referred to herein as a response component, can include data used in evaluating one or several responses received from the user device 106 in response to the data packet, and specifically in response to the presentation component and/or the one or several requests and/or questions of the presentation component. Thus, in some embodiments, the response component of the data packet can be used to ascertain whether the user has provided a desired response or an undesired response.

After the data components have been identified, the process 440 proceeds to block 450, wherein a delivery data packet is identified. In some embodiments, the delivery data packet can include the one or several data components of the data packets for delivery to a user such as the student-user via the user device 106. In some embodiments, the delivery packet can include the presentation component, and in some embodiments, the delivery packet can exclude the response packet. After the delivery data packet has been generated, the process 440 proceeds to block 452, wherein the delivery data packet is provided to the user device 106 and more specifically to the view module 674. In some embodiments, this can include providing the delivery data packet to the user device 106 via, for example, the communication network 120.

After the delivery data packet has been provided to the user device 106, the process 440 proceeds to block 454, wherein the data packet and/or one or several components thereof are sent to and/or provided to the response processor 678. In some embodiments, this sending of the data packet and/or one or several components thereof to the response processor can include receiving a response from the student-user, and sending the response to the student-user to the response processor simultaneous with the sending of the data packet and/or one or several components thereof to the response processor. In some embodiments, for example, this can include providing the response component to the response processor. In some embodiments, the response component can be provided to the response processor from the presentation system 408.

Figure 10B:
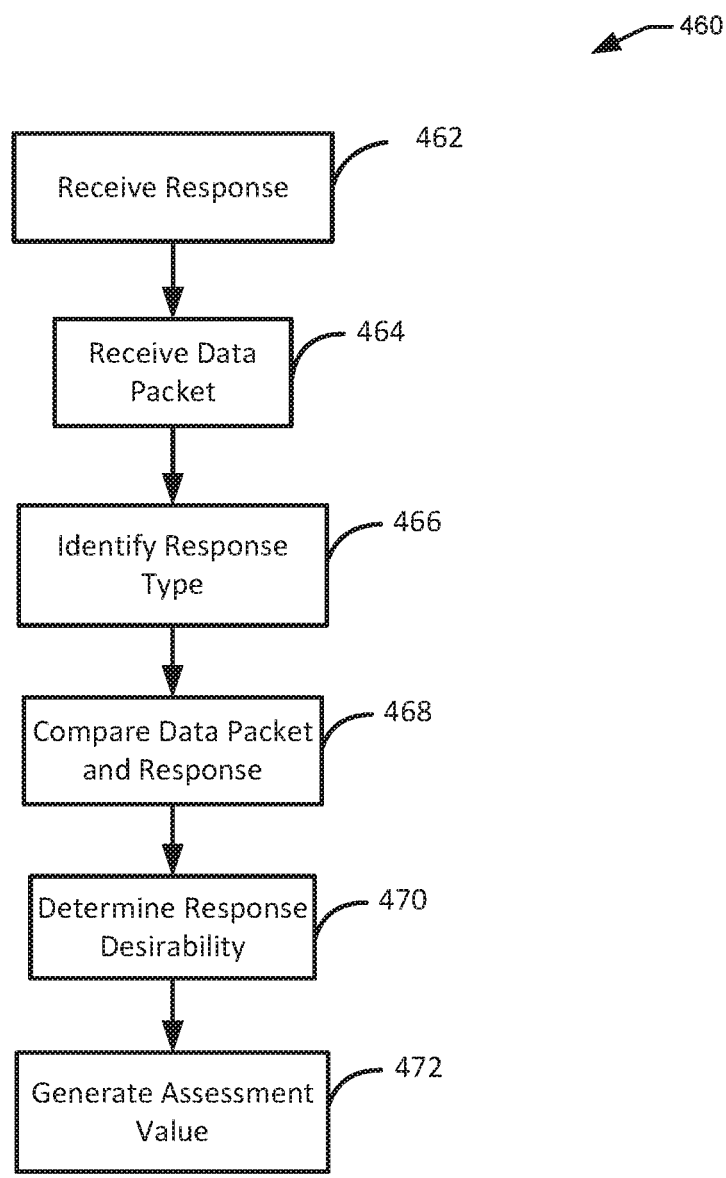
FIG. 10B is a flowchart illustrating one embodiment of a process for evaluating a response.

With reference now to FIG. 10B, a flowchart illustrating one embodiment of a process 460 for evaluating a response is shown. In some embodiments, the process can be performed as a part of the response process 676 and can be performed by, for example, the response system 406 and/or by the response processor 678. In some embodiments, the process 460 can be performed by the response system 406 in response to the receipt of a response, either directly or indirectly, from the user device 106 or from the view module 674.

The process 460 begins at block 462, wherein a response is received from, for example, the user device 106 via, for example, the communication network 120. After the response has been received, the process 460 proceeds to block 464, wherein the data packet associated with the response is received. In some embodiments, this can include receiving all or one or several components of the data packet such as, for example, the response component of the data packet. In some embodiments, the data packet can be received by the response processor from the presentation engine.

After the data packet has been received, the process 460 proceeds to block 466, wherein the response type is identified. In some embodiments, this identification can be performed based on data, such as metadata associated with the response. In other embodiments, this identification can be performed based on data packet information such as the response component.

In some embodiments, the response type can identify one or several attributes of the one or several requests and/or questions of the data packet such as, for example, the request and/or question type. In some embodiments, this can include identifying some or all of the one or several requests and/or questions as true/false, multiple choice, short answer, essay, or the like.

After the response type has been identified, the process 460 proceeds to block 468, wherein the data packet and the response are compared to determine whether the response comprises a desired response and/or an undesired response. In some embodiments, this can include comparing the received response and the data packet to determine if the received response matches all or portions of the response component of the data packet, to determine the degree to which the received response matches all or portions of the response component, to determine the degree to which the receive response embodies one or several qualities identified in the response component of the data packet, or the like. In some embodiments, this can include classifying the response according to one or several rules. In some embodiments, these rules can be used to classify the response as either desired or undesired. In some embodiments, these rules can be used to identify one or several errors and/or misconceptions evidenced in the response. In some embodiments, this can include, for example: use of natural language processing software and/or algorithms; use of one or several digital thesauruses; use of lemmatization software, dictionaries, and/or algorithms; or the like.

After the data packet and the response have been compared, the process 460 proceeds to block 470 wherein response desirability is determined. In some embodiments this can include, based on the result of the comparison of the data packet and the response, whether the response is a desired response or is an undesired response. In some embodiments, this can further include quantifying the degree to which the response is a desired response. This determination can include, for example, determining if the response is a correct response, an incorrect response, a partially correct response, or the like. In some embodiments, the determination of response desirability can include the generation of a value characterizing the response desirability and the storing of this value in one of the databases 104 such as, for example, the user profile database 301. After the response desirability has been determined, the process 460 proceeds to block 472, wherein an assessment value is generated. In some embodiments, the assessment value can be an aggregate value characterizing response desirability for one or more a plurality of responses. This assessment value can be stored in one of the databases 104 such as the user profile database 301.

Figure 11:
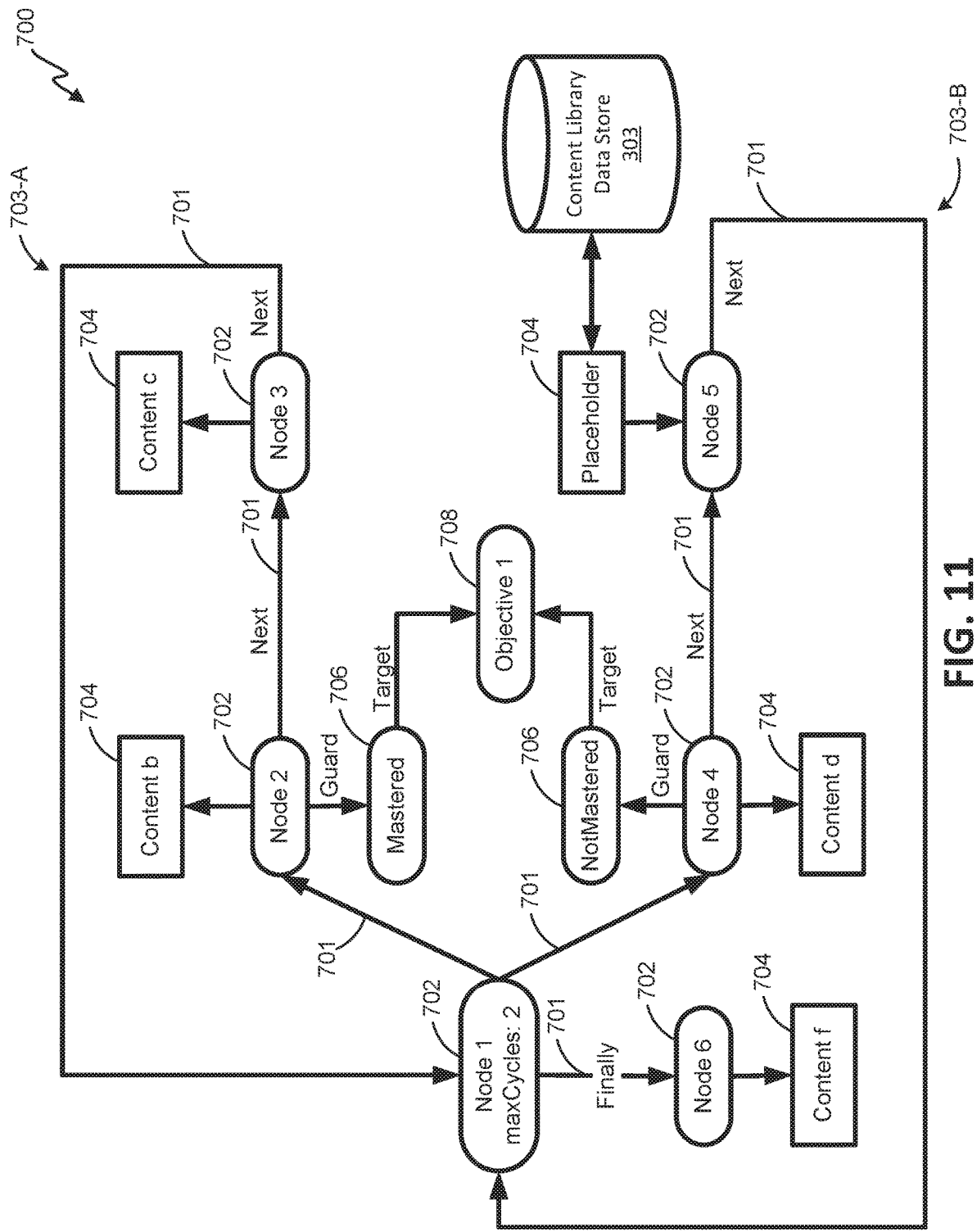
FIG. 11 is a schematic illustration of one embodiment of the content network.

With reference now to FIG. 11, a schematic illustration of one embodiment of the content network 700 is shown. In some embodiments, the content network 700, also referred to herein as the object network can include a plurality of edges 701 linking a plurality of nodes 702. In some embodiments, the edges 701 can link the nodes 702 in prerequisite relationships such that a single edge 701 links a pair of nodes 702, one of which of the pair of nodes 702 is a prerequisite to the other of the pair of nodes 702. In FIG. 11, this prerequisite relationship is indicated by the direction of the arrow of the edge 701 linking a pair of nodes 702 such that the origin of the arrow is at the prerequisite node and the head of the arrow is at the non-prerequisite node.

In the embodiment depicted in FIG. 11, these nodes 702 include node 1, node 2, node 3, node 4, node 5, and node 6. As further depicted in FIG. 11, some of the nodes 702 such as, for example, node 1 may be unassociated with content whereas others of the nodes 702 such as, for example, node 2, node 3, node 4, node 5, and node 6 can be associated with content 704. Specifically, node 2 is associated with content b, node 3 is associated with content c, node 4 is associated with content letter d, node 5 is associated with placeholder content also referred to herein up placeholder node, and node 6 is associated with content letter f In some embodiments, a placeholder node is a node whose content is not fixed but can be, for example, adaptively selected from, for example, a set of potential content or content objects that can be found in the database server 104. In some embodiments, this content can be adaptively selected based on one or several predictive or statistical models relating to content, the user, user skill level, or the like.

In some embodiments, the content of a placeholder node can be selected from one or several databases relevant to that placeholder node. These databases can be stored within, for example, the content library data store 303. In some embodiments, the content for presentation to a user at a placeholder node can be determined by the recommendation engine 686 based on statistical models which can be, for example, updated by the model engine based on data relating to one or several users past performance.

In some embodiments, some or all of the nodes 702 can be associated with a guard condition, also referred to herein as a gate condition, as indicated by conditions 706. In some embodiments, the guard condition can identify a prerequisite for entering and/or exiting a node 702. These guard conditions can, for example, predicate entry into a node 702 on a user's mastery and/or failure to master one or several previous nodes, objectives such as objective one 708, skill levels, or the like. In some embodiments, these guard conditions can predicate entry into and node 702 based on whether one or several responses to a previous node and/or to an assessment were correct or incorrect, or on the ratio of correct incorrect responses to a previous node or assessment. In some embodiments, these guard conditions can predicate entry into a node 702 based on the completion of a previous node 702 such as, for example, entry into node 3 is predicated on the completion of node 2. In some embodiments, each of these guard conditions can be associated with a node 702 and/or on edge 701. In some embodiments, each guard condition is associated with a node 702. In some embodiments, this can result in an entry in a database of nodes 702 identifying a specific node 702 including data relating to and/or identifying one or several guard conditions and/or one or several pointers to those one or several guard conditions.

In some embodiments, some or all of the nodes 702 of the content network 700 can be arranged into one or several loops 703. In some embodiments, the duration of the loop can be based on one or several guard conditions determining when a user can exit the loop and/or on criteria identifying the minimum and/or maximum number of cycles that a user can remain in the loop. Specifically, as shown in FIG. 700, node 1 comprises an indicator of the maximum number of cycles that a user can remain in the loops 703, and specifically indicates that the maximum number of cycles that a user can remain in the loops 703 is 2. In some embodiments, for example, the recommendation engine directing and/or controlling the movement of the user through the content network 700 can comprise a count that can be incremented each time that a user passes through a loop. This count can be compared to the indicator of the minimum and/or maximum number of cycles that user can remain in the loop to determine whether the user must be readmitted through the loop or whether the user should be prohibited from readmission into the loop.

As further seen in FIG. 11, node 1 comprises an edge 701 connecting node 1 to node 6. In some embodiments, when the count reaches the indicator of the maximum number of cycles that a user can remain in the loops, the user is then directed from node 1 to node 6.

Figure 12:
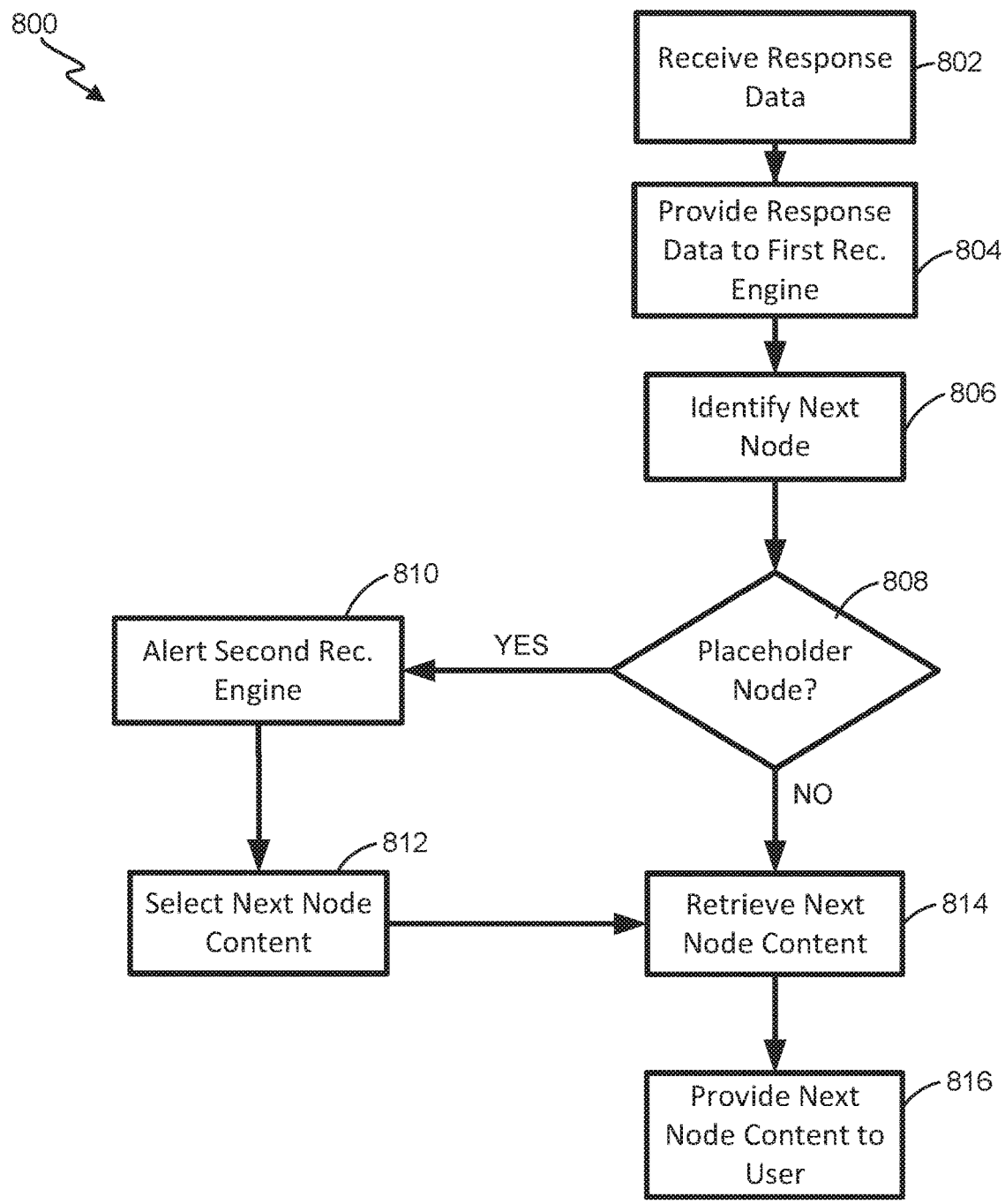
FIG. 12 is a flowchart illustrating one embodiment of a process for providing content to a user with two recommendation engines.

With reference now to FIG. 12, a flowchart illustrating one embodiment of a process 800 for providing content to a user with two recommendation engines is shown. The process 800 can be performed by all or portions of the content distribution network 100, and can be specifically performed using the engines and/or modules shown in FIGS. 9A to 9D. In one embodiment, the process 800 can be performed by the server 102 of the content distribution network using some or all of the engines and/or modules shown in FIGS. 9A to 9D.

The process 800 begins a block 802 wherein response data is received. In some embodiments, the response data can be received by the presenter module 672 and specifically by the external module 673 of the presenter module 672. In some embodiments, the response data can be received by the presenter module 672 from the user device 106 via the view module 674, and in some embodiments, the response that can be received by the external module 673 of the presenter module 672 from the user device 106 via the view module 674 and the internal module 675. In some embodiments, the response data can comprise a user response and/or data identifying a user response received for one or several previously provided data packets, assessments, or the like.

In some embodiments, and in response to the receipt of the response data, the presenter module 672 and/or the external module 673 of the presenter module 672 can assess the response data to determine whether the response comprises a correct or incorrect response, whether the user has mastered one or several objectives are skills relating to the response, whether the user has completed the previous data packet, or the like. In some embodiments, and in response to the receipt of the response data, the presenter module 672 can provide the response data to the response processor 678 for processing to determine the correctness or incorrectness of the response. In some embodiments, the response data can be directly provided to the response processor 678 and in some embodiments, the response data can be provided to the response processor 678 via the message channel 412. In some embodiments, and after the response processor 678 has evaluated the response data, the response processor 678 can provide data indicative of the result of the evaluation of the response data performed by the response processor to the presenter module 672. In some embodiments, the data indicative of the result of the evaluation can be directly provided to the presenter module 672 and/or indirectly provided to the presenter module 672 via the message channel 412.

After the response data has been received, the process 800 proceeds to block 804 wherein the response data is provided to the first recommendation engine. In some embodiments in which the first recommendation engine comprises the presenter module 672 and specifically the external module 673 of the presenter module 672, the receipt of the response by the presenter module 672 can comprise the providing of the response data to the first recommendation engine. In some embodiments in which the first recommendation engine comprises the presenter module 672 and specifically the external module 673 of the presenter module 672, the receipt, by the presenter module 672, of the data indicative of the result of the evaluation from the response processor 678 can comprise the providing of the response data to the first recommendation engine. In some embodiments in which the first recommendation engine is separate from presenter module 672, the presenter module 672 can provide data indicative of the result of the evaluation to that first recommendation engine in the form of one or several electrical signals.

After the response data has been provided to the first recommendation engine, the process 800 proceeds to block 806 wherein a next node is identified. In some embodiments, this next node is identified according to the application of one or several rules or conditions to the user history of the user source of response data received in block 802. In some embodiments, the next node can be identified according to the application of one or several rules or conditions to the data indicative of the result of the evaluation of the response data by the response processor 678. In some embodiments, this next node can be identified by the first recommendation engine.

After the next node has been identified, the process 800 proceeds to decision state 808 wherein it is determined if the next node comprises a placeholder node. In some embodiments this determination can include determining whether the next node is associated with specific, constant content, or if the next node is associated with adaptively selected content. If it is determined that the next node is a placeholder node, then the process 800 proceeds to block 810 wherein a second recommendation engine is alerted. In some embodiments, the second recommendation engine can comprise a recommendation engine configured to adaptively select content for providing to a user in a placeholder node. In some embodiments, the adaptive selection of content is based on one or several statistical models representing one or several attributes of the content, the user history, a user skill level, a user learning style, or the like. In some embodiments, the alerting of the second recommendation engine can comprise the sending of one or several electrical signals to the second recommendation engine which one or several electrical signals can comprise, for example, user data, response data, or the like.

After the second recommendation has been alerted, the process 800 proceeds to block 812 wherein the next node content is selected. In some embodiments, the next node content can be selected according to a placeholder algorithm which is described in process 840 of FIG. 14. In some embodiments, this can include the identification of next content from, for example, a database of potential next content based on the statistical models, which database of next content can be located in the database server 104, and particularly in the content library database 303. The selection of the next node content can be made by the second recommendation engine which can reside in, for example, recommendation engine 686.

After the next node content has been selected, or returning again to decision state 808 if it is determined the next node is not a placeholder node, then the process 800 proceeds to block 814 where next node content is received or retrieved. In embodiments in which the next node is not a placeholder node, then the next content can be the content associated with the next node. In the embodiments in which the next node is a placeholder node, then the next content can be the next node content selected in block 812. In some embodiments, the next node content can be retrieved from the database server 104, and particularly from the content library database 303.

After the next node content has been retrieved, the process 800 proceeds to block 816, wherein the next node content is provided to the user. In some embodiments, this can include generating a communication containing the next node content, which communication can comprise a plurality of electrical signals and sending the communication to the user device 106 from which the response data was received in block 802. In some embodiments, the next node content is provided to the user via the user device 106, and is particularly provided to the user device 106 from the presenter module 672 via the view module 674. In some embodiments, the next node content is provided to the user device from the presenter module 672, and particularly from the external module 673 of the presenter module 672 to the internal module 675 of the presenter module 672, then from the internal module 675 of the presenter module 672 to the view module 674, and then to the user via the I/O subsystem 526 of the user device 106.

Figure 13:
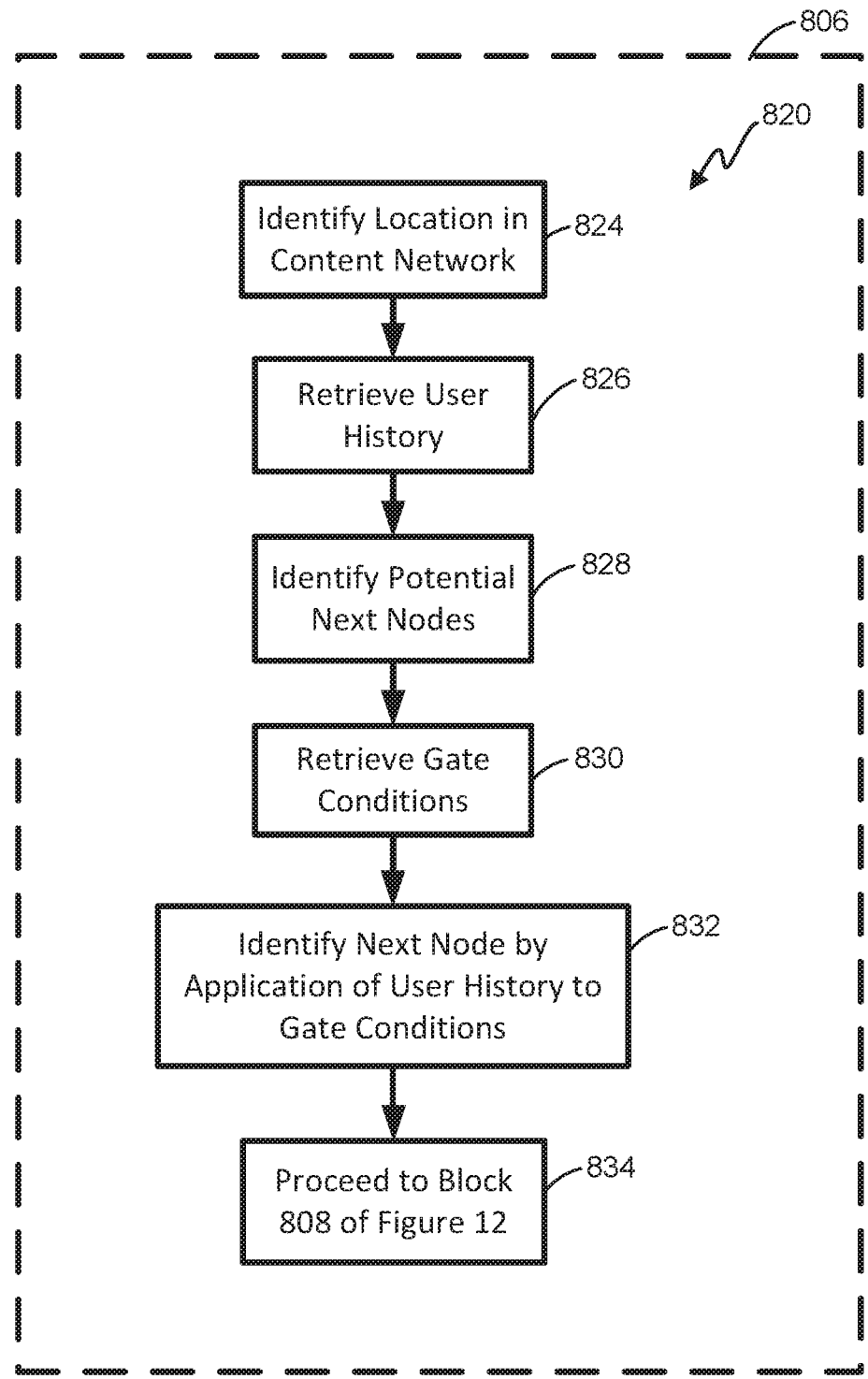
FIG. 13 is a flowchart illustrating one embodiment of a process for identifying the next node.

With reference now to FIG. 13, a flowchart illustrating one embodiment of a process 820 for identifying the next node is shown. The process 820 can be performed by all or portions of the content distribution network 100 including some or all of the engines are modules shown in FIGS. 9A to 9D. In some embodiments, the process 820 can be performed by the first recommendation engine which can be, in some embodiments, located in one or both of the presentation module 672 and the recommendation engine 686. In some embodiments, the process 820 can be performed as a part of or in place of step 806 FIG. 12.

The process 820 begins at block 824 wherein the user's location content network is determined. In some embodiments, this can include determining the content network in which the user is located, and/or selecting one of one or several content networks in which the user is located. In some embodiments, the user is the user source of the response they received in block 802. In some embodiments, this user can be identified based on the response they received in block 802 and/or based on, for example, a user identifier provided at the time of user login before the step of block 802 of FIG. 8. In some embodiments, the determination of the user's content network and/or location in the content network can be based on the identification of the data packet and/or node 702 associated with the response data received in block 802. In some embodiments, the user's location in the content network can be determined by identifying the data packet and/or node 702 associated with the response they received 802 and then identifying that data packet and/or node 702 in the content network.

After the location the content network is been identified, the process 820 proceeds to block 826 wherein user history data is retrieved. In some embodiments, the user history data can be retrieved for the user source of the response received in block 802. In some embodiments, this user history can identify user performance on one or several previous assessments, data packets, tasks, nodes, or the like. In some embodiments, the user history can be retrieved from the user profile database 301 or from another location on the database server 104.

After the user history has been retrieved, the process 820 proceeds to block 828 wherein one or several potential next nodes are identified. As is shown in FIG. 11 with respect to node 1, in some embodiments the potential next nodes can comprise a plurality of next nodes.

As is shown in FIG. 11 with respect to node 2, in some embodiments, the potential next node can comprise a single next node. In some embodiments, potential next nodes can be identified by identifying the node of the user's location in the content network, also referred to herein as an origin node, identifying edges extending from the node of the user's location, and identifying non-prerequisite nodes to the node of the user's location connected to the node of the user's location via the identified edges. In some embodiments, the potential next nodes can be identified by the first recommendation engine.

After the potential next nodes have been identified, the process 820 proceeds to block 830 wherein the conditions for the identified potential next nodes are retrieved. In some embodiments, each of these gate conditions can identify one or several requirements for advancing to a least one of the identified potential next nodes. These gate conditions can be retrieved from the database server 104 and specifically from the content library database 303. In some embodiments, each of the gate conditions can be stored and/or represented via, for example, a pointer, in the content library database 303 in association with its node. In some embodiments, the gate conditions can be retrieved from the database server 104 by querying the database server 104 four gate conditions associated with the identified potential next nodes.

After the gate conditions have been retrieved, the process 820 proceeds to block 832 when the next node is identified by application of all or portions of the user history to the retrieved gate conditions. In some embodiments, this can include comparing and/or applying user history data relevant to one or several data packets and/or assessments previously presented and/or provided to the user to the gate conditions retrieved in block 830. In some embodiments, this can further include comparing and/or applying user history data relevant to the response received in block 802 to the gate conditions retrieved in block 830. In some embodiments, this comparison and/or application of user history data in gate conditions can result in the identification of one node as the next node.

In one embodiment, for example, the application of the user history to the gate conditions can comprise: identifying the set of potential next nodes; selecting one of the potential next nodes; identifying the guard conditions of the selected potential next node; comparing the user history to the guard conditions of the potential next node, and associating a value with the potential next node based on the result of the comparison of the user history to the guard conditions of that potential next node. In some embodiments, a first value can be associated with the selected potential next node when a comparison of the guard conditions of the selected next node to the user history indicates that all of the guard conditions have been met and the user can enter the selected next node. Further, in some embodiments, a second value can be associated with the selected potential next node when a comparison of the guard conditions of the selected next node to the user history indicates that not all of the guard conditions have been met and the user cannot enter the selected next node. In some embodiments, these steps can be repeated until all of the potential next nodes have been selected. Alternatively, in some embodiments, these steps can be repeated until a selected potential next node is associated with the first value. In such an embodiment, the first selected potential next node associated with the first value is identified as the next node. After the next node has been identified, the process 800 proceeds to block 834 and continues to block 808 of FIG. 12.

Figure 14:
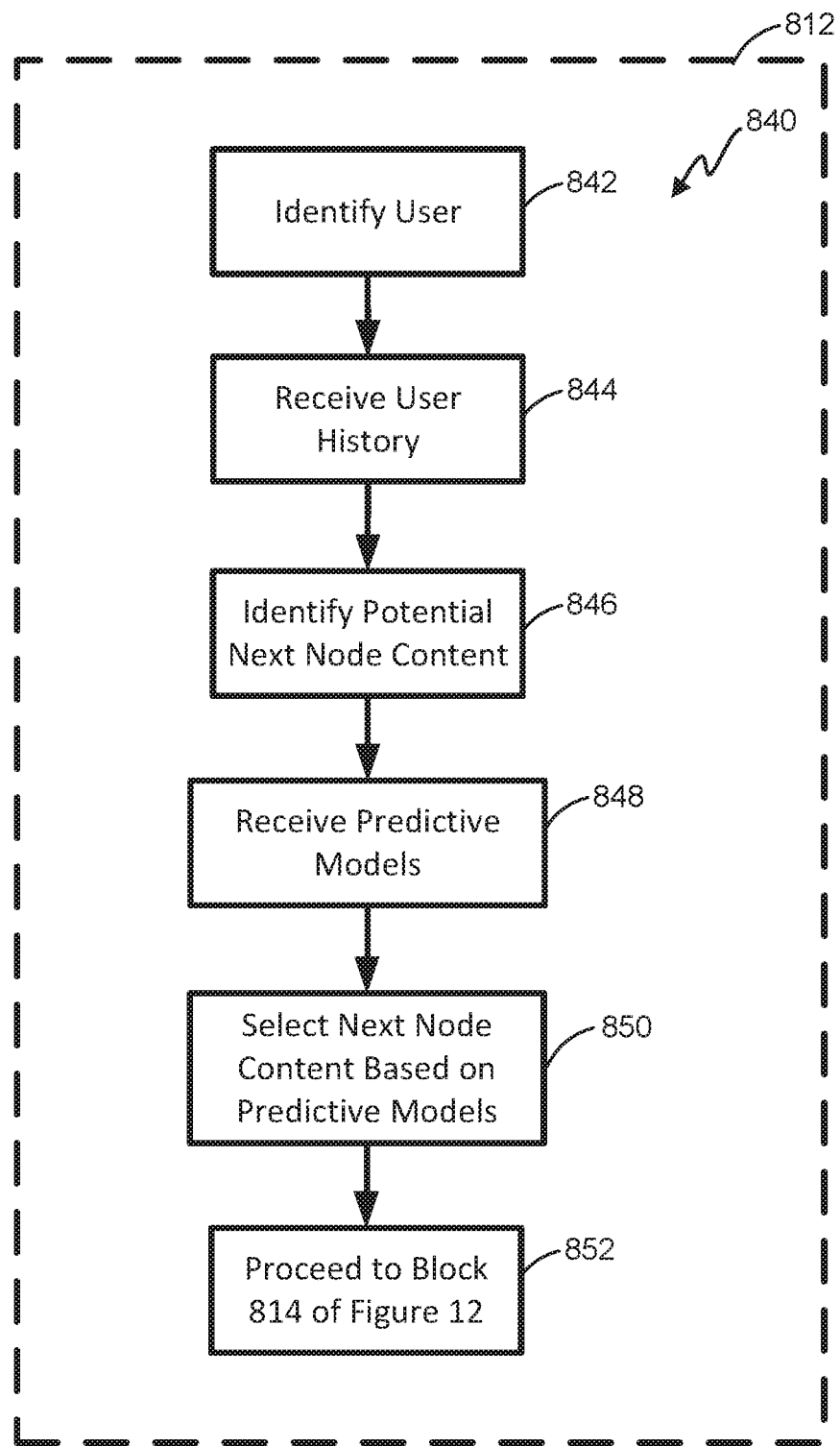
FIG. 14 is a flowchart illustrating one embodiment of a process for selecting next node content.

With reference now to FIG. 14, a flowchart illustrating one embodiment of a process 840 for selecting next node content is shown. The process 840 can be performed by all or portions of the content distribution network 100 including some or all of the engines modules shown in FIGS. 9A to 9D. In some embodiments, the process 840 can be performed by the second recommendation engine which can be, in some embodiments, located in the recommendation engine 686. In some embodiments, the process 840 can be performed as a part of or in place of step 812 in FIG. 12.

The process 840 begins at block 842 wherein the user is identified. In some embodiments, the user can be identified based on the response received in block 802 and/or based on, for example, a user identifier provided at the time of user login before the step of block 802 of FIG. 8. After the user has been identified, the process 840 proceeds to block 844 wherein user history data is retrieved. In some embodiments, the user history data can be retrieved for the user source of the response received in block 802. In some embodiments, this user history can identify user performance on one or several previous assessments, data packets, tasks, nodes, or the like. In some embodiments, the user history can be retrieved from the user profile database 301 or from another location on the database server 104.

After the user history has been retrieved, the process 840 proceeds to block 846 wherein potential next node content is identified. In some embodiments, this can comprise identifying the database of potential next node content associated with the placeholder node. In some embodiments, this database of potential next node content can be stored in the database server 104, and particularly in the content library database 303 of the database server 104.

After the potential next node content has been identified, the process 840 proceeds to block 848 wherein one or several predictive models are received or retrieved. In some embodiments, these models can comprise a plurality of statistical models stored in a database server. In some embodiments, at least one of the statistical models identifies one of: a skill level or a discrimination of the next data packet. In some embodiments, these statistical models can include one or several evidence models, risk models, skill models, or the like. In some embodiments, an evidence model can be a mathematically-based statistical model. The evidence model can be based on, for example, Item Response Theory (IRT), Bayesian Network (Bayes net), Performance Factor Analysis (PFA), or the like. The evidence model can, in some embodiments, be customizable to a user and/or to one or several content items. Specifically, one or several inputs relating to the user and/or to one or several content items can be inserted into the evidence model. In some embodiments, these predictive models can be retrieved from the database server 104 and specifically from the model database 309 in the database server 104.

After the predictive models have been received or retrieved, the process 840 proceeds to block 850 wherein the next node content is selected based on the predictive models. In some embodiments, this can include identifying one or several features of the potential next node content, identifying one or several features in the user history, extracting these one or several features, generating one or several parameters from the one or several features, and inputting some or all of the one or several features and/or one or several parameters into the retrieved predictive models. In some embodiments, the model can then, based on the input features and/or parameters, generate a model output identifying one or several of the potential next node content for selection as the next node content. In some embodiments, this can be performed by the server 102 using the second recommendation engine that can be, for example, located in the recommendation engine 636. After the next node content has been selected, the process 840 continues to block 852 and then proceeds to block 814 identified in FIG. 12.

Figure 15:
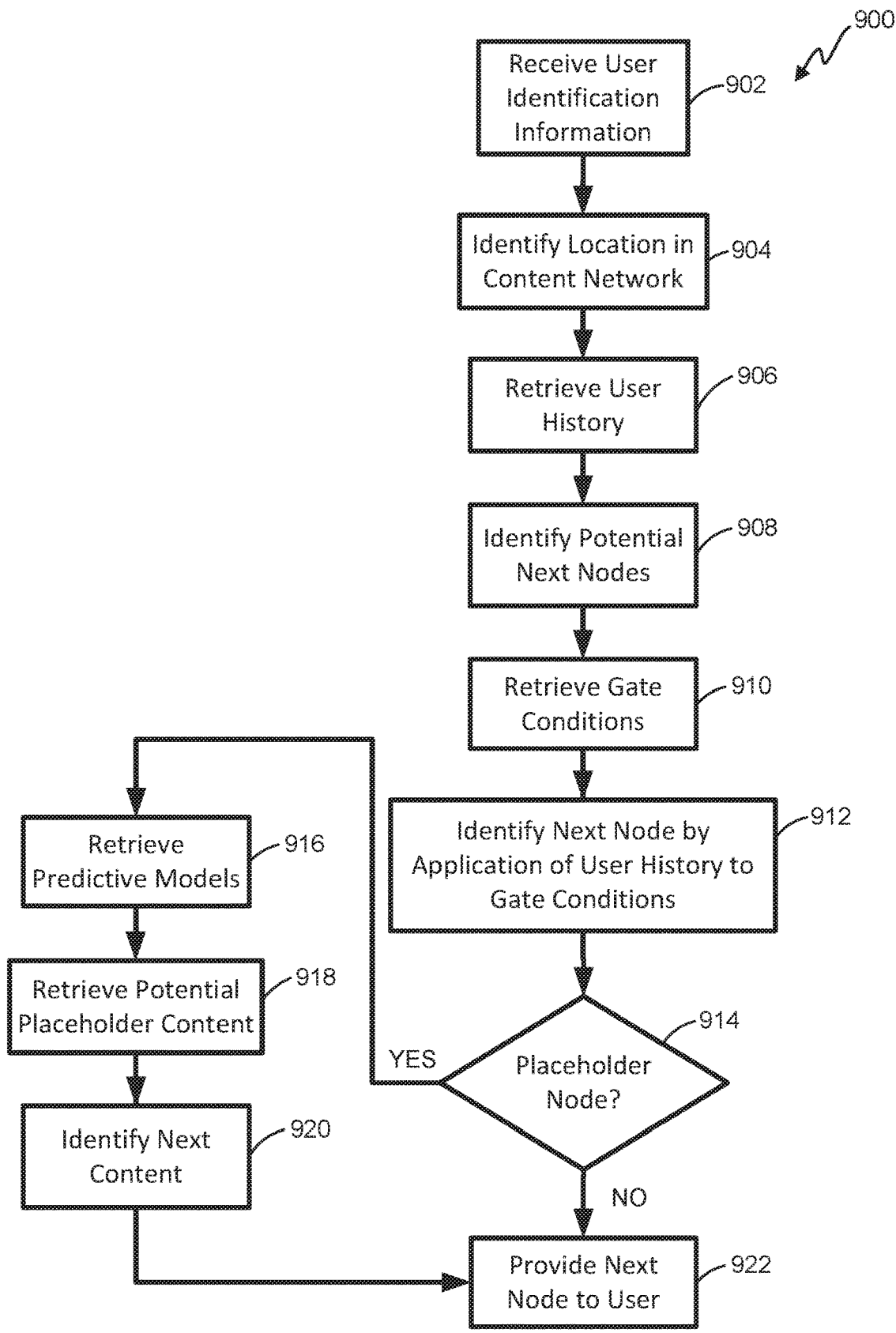
FIG. 15 is a flowchart illustrating one embodiment of a process for selecting next node content based on the determination of the presence of a placeholder node.

With reference now to FIG. 15, a flowchart illustrating one embodiment of a process 900 for selecting next node content is shown. The process 900 can be performed by all or portions of the content distribution network 100, and can be specifically performed using the engines and/or modules shown in FIGS. 9A to 9D. In one embodiment, the process 900 can be performed by the server 102 of the content distribution network using some or all of the engines and/or modules shown in FIGS. 9A to 9D. The process 900 begins at block 902 wherein user identification information is received. In some embodiments, user identification information can include a username, password, login information, a unique user identifier, or the like. In some embodiments, the user identification information can be received by the user device 106 via the I/O subsystem 526 of the user device 106 and can be provided to the server 102 via the communication subsystem(s) 532 of one or both of the user device 106 and the server 102, and communication network 120. After the user identification information has been received, the user associated with user identification information can be identified. In some embodiments, this can include comparing the received user identification information to information stored in the database server such as, for example, user profile database 301. In some embodiments, for example, user identification information can be uniquely associated with user information stored in the user profile database 301 and the user can be identified by making the received user identification information with that user information.

After the user identification information has been received, the process 900 proceeds block 904 wherein the location of the user and the content network is identified and/or determined. In some embodiments, the user whose location is in the content network is determined is the user for whom user identification information was received in block 902. In some embodiments, the determination of the user's location in the content network can comprise, for example, retrieving user history data identifying the last completed node 702 for the user. In some embodiments, this user history data can be stored in the database server 104, and specifically in the user profile database 301. In some embodiments, the determination user's location in the content network can comprise identifying the last response provided by the user to content associated with the node and identifying the node associated with that last response. In some embodiments, the determination of the user's location in the content network can be performed by the server 102, and more specifically by, for example, the presenter module 672.

After the location in the content network has been determined, the process 900 proceeds block 906 wherein user history is retrieved. In some embodiments, the user history can comprise user history data that can be retrieved for the user for whom the user identification information was received in block 902. In some embodiments, this user history can identify user performance on one or several previous assessments, data packets, tasks, nodes, or the like. This user history can be, in some embodiments, specific to a single user such as the user for whom the user identification information was received in block 902, or specific to a group of users. In some embodiments, the user history can be retrieved from the user profile database 301 or from another location on the database server 104.

After the user history has been retrieved, the process 900 proceeds to block 908 wherein one or several potential next nodes are identified. In some embodiments, these one or several potential next nodes can comprise one or several non-prerequisite nodes directly linked to the node of the user's current location in the content network by an edge 701. In some embodiments, these potential next nodes can be identified by identifying edges extending from the node of the user's location in the content network, and identifying the nodes connected to the node of the user's current location in the content network by the identified edges, and generating a subset of those nodes that are non-prerequisite nodes to the node of the user's current location in the content network. In some embodiments, the potential next nodes can be identified by the server 102, and more specifically by the recommendation engine 686 and/or the presenter module 672.

After the potential next nodes are identified, the process 900 proceeds to block 910 wherein gate conditions are retrieved. In some embodiments, these gate conditions can be the gate conditions associated with the potential next nodes identified in block 908. In some embodiments, the gate conditions can be retrieved from the database server 104, and specifically from the content library database 303. In some embodiments, the key conditions can be retrieved by querying the content library database for gate conditions associated with the nodes identified as potential next nodes.

After the gate conditions have been retrieved, the process 900 proceeds to block 912 wherein the next node is identified by application of the user history to the gate conditions. In some embodiments, the next node can be selected by the first recommendation engine and/or the presenter module 672. In some embodiments, the next node can be selected from the set of potential next nodes identified in block 908.

After the next node has been identified, the process 900 proceeds decision state 914 wherein it is determined if the next node is a placeholder node. This determination can include determining whether the next node is associated with specific, constant content, or if the next node is associated with adaptively selected content. In some embodiments, for example, nodes 702 can be associated with a first value when they are not placeholder nodes and with a second value when they are placeholder nodes. In some embodiments, determining if the next node is a placeholder node can comprise determining if the next node is associated with the first value or with the second value.

If it is determined that the next node is a placeholder node, then the process 900 proceeds to block 916 wherein one or more predictive models are retrieved. In some embodiments, these models can comprise a plurality of statistical models stored in a database server. In some embodiments, at least one of the statistical models identifies one of: a skill level or a discrimination of the next data packet. In some embodiments, these statistical models can include one or several evidence models, risk models, skill models, or the like. In some embodiments, an evidence model can be a mathematically-based statistical model. The evidence model can be based on, for example, Item Response Theory (IRT), Bayesian Network (Bayes net), Performance Factor Analysis (PFA), or the like. The evidence model can, in some embodiments, be customizable to a user and/or to one or several content items. Specifically, one or several inputs relating to the user and/or to one or several content items can be inserted into the evidence model. In some embodiments, these predictive models can be retrieved from the database server 104 and specifically from the model database 309 in the database server 104.

After the predictive models have been retrieved, the process 900 proceeds to block 918 wherein potential placeholder content is retrieved. In some embodiments, the retrieval of potential placeholder content can include the identification of potential placeholder content. In some embodiments, and as discussed above, a placeholder node can be associated with a set of content that can be selectively presented in the place of the placeholder node. In some embodiments, the set of content can be stored in the database server 104 and specifically in the content library database 303 of the database server. In some embodiments, the set of potential placeholder content can be identified through a query of a database containing the potential placeholder content for potential placeholder content associated with the selected next placeholder node. In some embodiments, this query can be sent to the database server 104 by the server 102. In some embodiments, the potential placeholder content can be received by the server 102 from the database server 104 in response to the query of the database server 104 for potential placeholder content.

After the set of potential placeholder content has been identified, the process 900 proceeds to block 920 wherein placeholder content is selected. In some embodiments, the placeholder content is selected from the set of potential placeholder content via, for example, the application of one or more models, such as those stored in the model database 309, to attributes of the user for whom identification information was received in block 902 and/or two attributes of the placeholder content in the set of potential placeholder content. In some embodiments, these models can be updated by the model engine 682 based on one or several previously received responses from one or several users and the updated models can be stored in the model database 309.

In some embodiments, these models can be used to adaptively select the next placeholder content. In some embodiments, for example, this can include using one or more of the models to generate a prediction of the user skill level, a prediction of the difficulty levels of one or several pieces of placeholder content in the set of potential placeholder content, a prediction of the amount of time required for the user to complete one or several pieces of placeholder content in the set of placeholder content, a likelihood of the user successfully completing one or several pieces of placeholder content in the set of placeholder content, or the like. In some embodiments, for example, the piece of placeholder content can be selected that has a skill level or difficulty level best corresponding to a skill level of the user. In some embodiments, for example, the piece of placeholder content can be selected that has a desired likelihood of the user successfully completing that piece of placeholder content. In some embodiments, the piece of placeholder content can be selected by the second recommendation engine and/or the recommendation engine 686.

After the next content has been identified, and returning again to decision state 914 if it is determined that the next node is not a placeholder node, then the process 900 proceeds to block 922 wherein the next node is provided to the user. In some embodiments, the next node can comprise the node and/or associated content identified in block 912 or in case the next node is a placeholder node, the next node can comprise the next content identified in block 920.

In some embodiments, the next node and/or content associated with the next node is provided to the user via the user device 106, and is particularly provided to the user device 106 from the presenter module 672 via the view module 674. In some embodiments, the next node content is provided to the user device from the presenter module 672, and particularly from the external module 673 of the presenter module 672 to the internal module 675 of the presenter module 672, then from the internal module 675 of the presenter module 672 to the view module 674, and then to the user via the I/O subsystem 526 of the user device 106.

Figure 16:
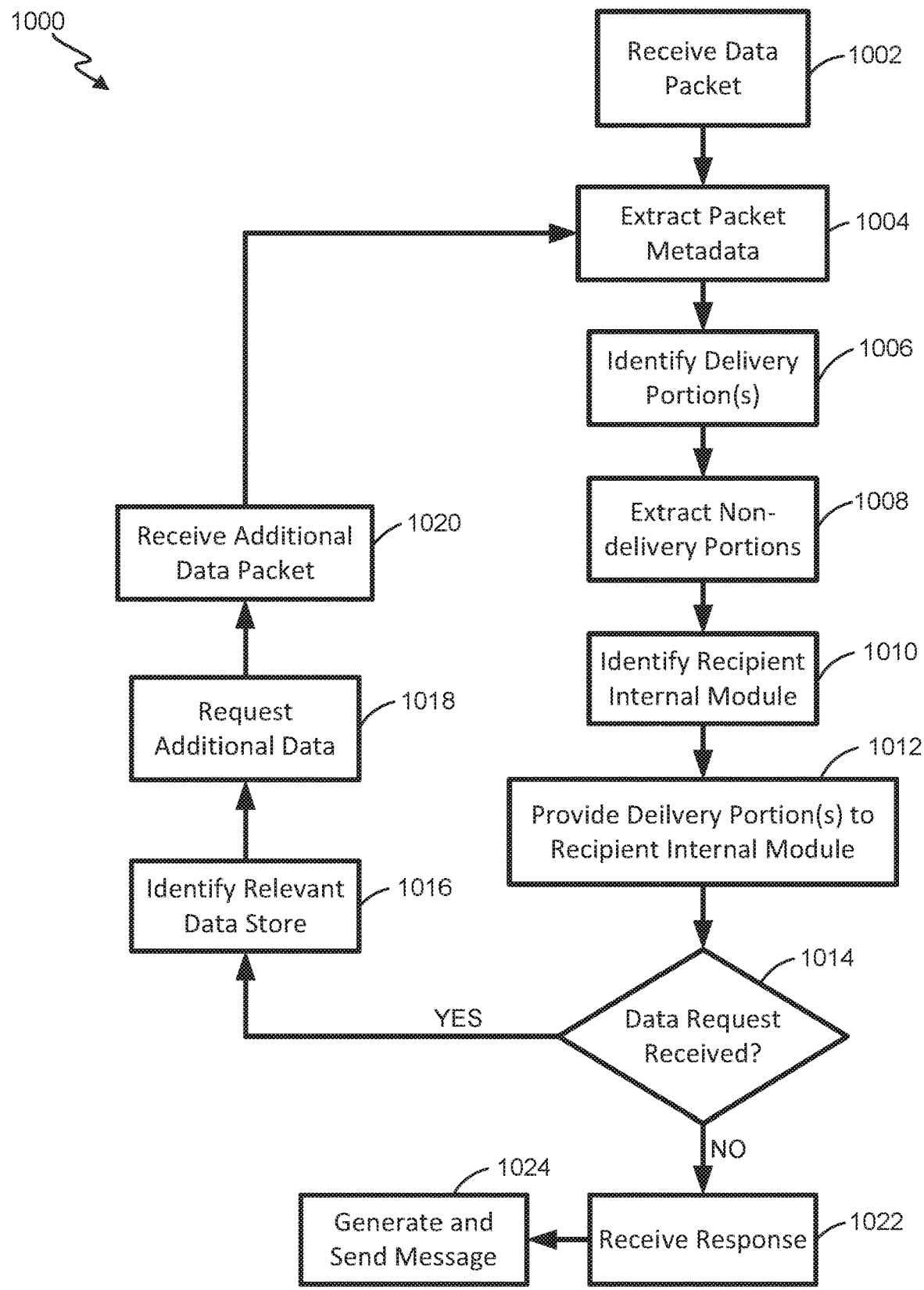
FIG. 16 is a flowchart illustrating one embodiment of a process for operation of a two-part presentation engine.

With reference now to FIG. 16, a flowchart illustrating one embodiment of a process 1000 for operation of a two-part presentation engine is shown. In some embodiments, this process specifically relates to the operation of the presenter module 672 as it interacts with the view module 674 depicted in FIGS. 9A to 9D. In some embodiments, some or all of the steps of process 1000 can be performed by the external module 673 of the presenter module 672. The process begins at block 1002 wherein the data packet is received by a portion of the presentation engine, and specifically by the presenter module 672. In some embodiments, data identifying the intended user/recipient of the received data packet can be received simultaneous with the receipt of the data packet. In some embodiments, the data packet can be received by the presenter module 672 from the recommendation engine 686, from the message Channel 412, and/or from the database server 104 or more specifically from the content library database 303.

After the data packet has been received, the process 1000 proceeds to block 1004 wherein packet metadata is extracted from the data packet. In some embodiments, the packet metadata comprises data identifying one or several attributes of the other data of the data packet. In some embodiments, for example, this metadata can identify one or several portions of data in the data packet such as, for example, the presentation portion of the data in the data packet that is intended for providing to the user and the non-presentation portion of the data in the data packet that is not intended for providing to the user. In some embodiments, for example, the non-presentation portion of the data in the data packet can comprise answer data and/or data for use in evaluating one or several user responses to the data packet. In some embodiments, the metadata can further comprise information identifying one or several guard conditions associated with the data packet. In some embodiments, the metadata can be extracted from the data packet received in block 1002 by a portion of the presentation engine and specifically by the presenter module 672.

After the packet metadata has been extracted, the process 1000 to proceeds block 1006 wherein the delivery portions of the data packet are identified. In some embodiments, this can include using the extracted packet metadata to delineate between the delivery portions of the data packet and the non-delivery portions of the data packet. After the delivery portions of the data packet has been identified, the process 1000 proceeds block 1008, wherein the non-delivery portions of the data packet are extracted. In some embodiments, this can include removing the non-delivery portions from data forming the payload of a potential communication from the presenter module 672 to the view module 674.

After the non-delivery portions have been extracted from the data packet, the process 1000 proceeds to block 1010 wherein the recipient internal module 675 is identified by the external module 673 of the presenter module 672. In embodiments in which the presenter module 672 does not include an external module 673 and an internal module 675, step 1010 can include the identifying of the recipient view module 674 by the presenter module 672. In some embodiments, this can include identifying the internal module 675 and/or the view module 674 associated with the intended recipient of the data packet received in block 1002, which intended recipient can be identified based on data identifying the intended recipient received simultaneous with the receipt of the data packet in block 1002.

After the recipient internal module 675 and/or view module 674 has been identified, the process 1000 proceeds to block 1012 wherein the delivery portion is provided to the identified recipient internal module 675 and/or view module 674. In some embodiments, this can include the generation of one or several electrical signals by the external module 673 and/or the presenter module 672 and sending these are several electrical signals to the recipient identified in block 1010. In some embodiments, these one or several electrical signals can comprise the delivery portions identified in block 1006. In some embodiments, these electrical signals can be transmitted via the communication network 120 and the communication subsystems 532 of the server 102 and/or of the user device 106.

After the delivery portions have been provided, the process 1000 proceeds to decision state 1014 wherein it is determined if a data request is received. In some embodiments, for example, the external module 673 and/or the presenter module 672 can receive a request from either the internal module 675 and/or the view module 674 for additional data. In some embodiments, this request can be received in response to the delivery of portions of the data packet in block 1012 and/or independent of the delivery of portions of the data packet in block 1012.

If it is determined that a data request has been received, then the process proceeds to block 1016 wherein a relevant data store is identified. In some embodiments, this can include identifying one or several databases in the database server 104 containing the requested data. In some embodiments, these one or several databases can be identified by querying the database server and/or one or several of the databases of the database server 104 such as the content library database 303 for the requested data. In some embodiments, in response to such a query, the database server 104 and/or the recipient databases of that query can respond and identify whether they contain the requested data. If the database and/or the database server 104 contains the requested data, then that database and/or the database server 104 is identified as a relevant data store.

After the relevant data store has been identified, the process 1000 proceeds to block 1018 wherein the additional data is requested. In some embodiments, this additional data can be requested from the identified relevant data store by, for example, the server 102. After the additional data has been requested, the process 1000 proceeds to block 1020 wherein one or several additional data packets and/or the requested data is received. In some embodiments, this requested data and/or one or several additional requested data packets can be received by the server 102 and specifically by the presenter module 672 or the external module 673 of the presenter module 672 from the identified relevant data store. After the one or several additional data packets and/or the requested data has been received, the process 1000 continues to block 1004 and proceeds as outlined above.

Returning again to decision state 1014, if it is determined that no additional data is requested or that no data request is received, then the process 1000 proceeds to block 1022 wherein a response is received. In some embodiments, this response can relate to the data packet received in block 1002, and in some embodiments, this response can relate to the additional data packet received in block 1020. In some embodiments, this response can be received after the determination of decision state 1014 or at any other point in process 1000. In some embodiments, this response can be received from the user device 106 via the communication network 120 in connection with the delivery portions delivered in block 1012. In some embodiments, this response can be received by the presenter module 672 from the view module 674 and in some embodiments, this response can be received by the external module 673 from the internal module 675, which internal module 675 received the response from the view module 674.

After the responses have been received, the process 1000 proceeds to block 1024 wherein a message is generated and sent to one or several other components of the content distribution network 100. In some embodiments, this message can be one or several electrical signals and can comprise data indicative of the received response and/or the received response. This message can be generated by the external module 675 and/or the presenter module 672 and can be sent to, for example, the message Channel 412 and/or the response processor 678, the model engine 682, and/or the recommendation engine. In some embodiments, the message can be sent via one or several communication subsystems 532 in the communication network 120.

Figure 17:
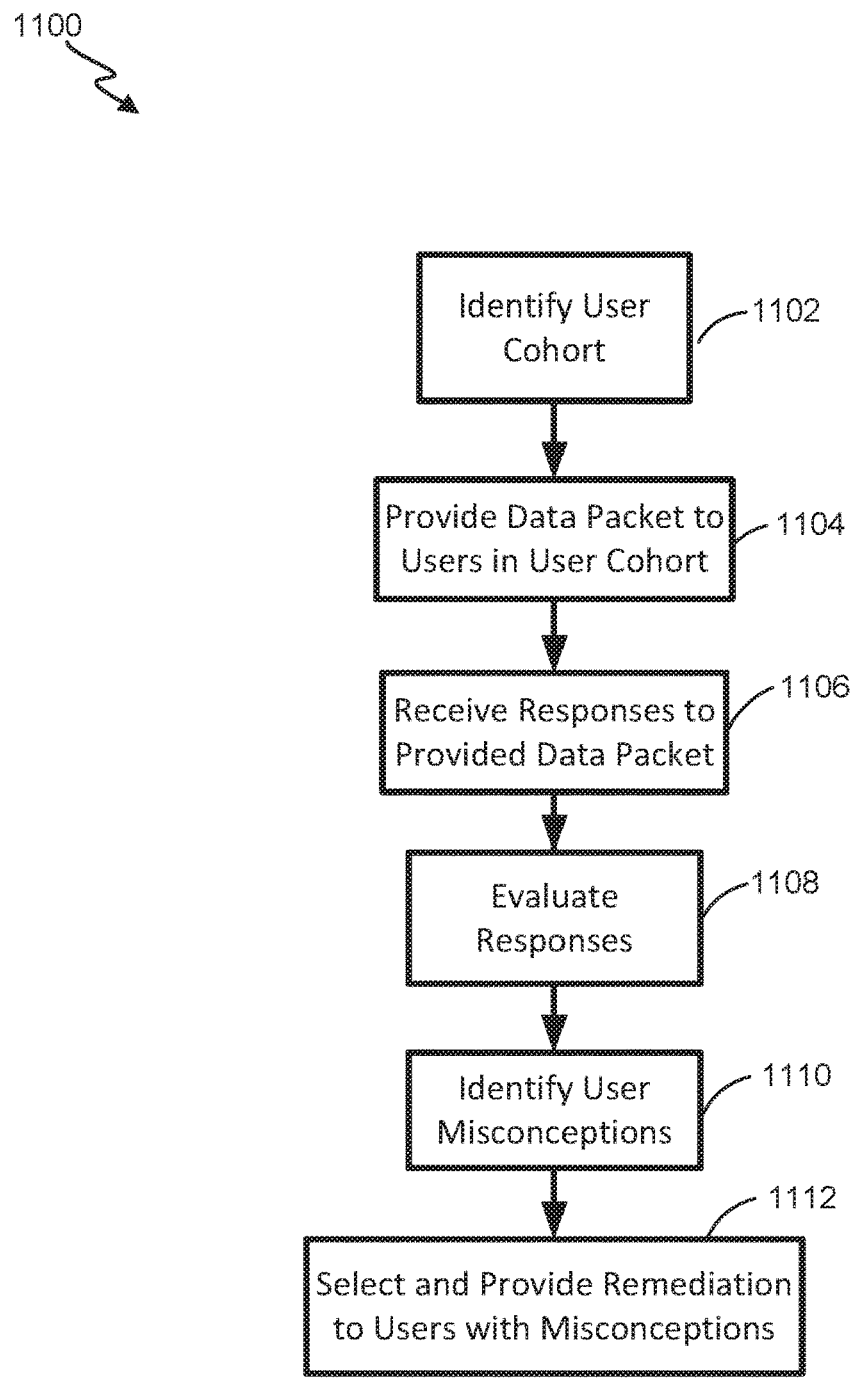
FIG. 17 is a flowchart illustrating one embodiment of a process for automated misconception identification and remediation.

With reference now to FIG. 17, a flowchart illustrating one embodiment of a process 1100 for automated misconception identification and remediation is shown. The process 1100 can be performed by all or portions of the content distribution network 100, and can be specifically performed using the engines and/or modules shown in FIGS. 9A to 9D. In one embodiment, the process 1100 can be performed by the server 102 of the content distribution network using some or all of the engines and/or modules shown in FIGS. 9A to 9D. The process begins a block 1102 wherein a user cohort is identified. In some embodiments, the user cohort comprises a group of similarly situated users. In some embodiments, user cohort can comprise one or several users belonging to a common group, class, club, level, or the like. In some embodiments, the cohort can be identified based on user inputs received by the server 102 from, for example, user device 106 and/or supervisor device 110.

After the user cohort has been identified, the process 1100 proceeds block 1104 wherein a data packet is provided to the users in the user cohort identified in block 1102. In some embodiments, the data packet can be selected according to one of the processes described herein. Specifically, in some embodiments, the data packet can be selected by the recommendation engine 686 and can be provided to the user via the user device 106 and specifically via a combination of the I/O subsystem 526, the view module 674, presenter module six or 72, and the user device 106.

After the data packet has been provided to the users in the user cohort, the process 1100 proceeds block 1106 wherein responses to the provided data packet are received. In some embodiments, for example, a response can be received from each of the users in the user cohort in some embodiments, the response can be received from each of some of the users in the user cohort. In some embodiments, the response can be received by the server 102 and specifically by the presenter module 672 via the view module 674, the communications subsystem 532, the I/O system 526, and the user device 106.

After the responses have been received, the process 1100 proceeds to block 1108 wherein the responses received in block 1106 are evaluated. In some embodiments, the evaluation of the responses can include the translation of each of the responses into an observable. In some embodiments, this translation of each of the responses into an observable can include determining whether each of the received responses comprises a correct response or an incorrect response, alternatively referred to herein as a desired response or an undesired response respectively. In some embodiments, the responses can be evaluated by the response processor 678 according to comparative data stored in the content library database 303. In some embodiments, the evaluation of the responses can include associating each of the received responses with the value, and specifically associating each of the responses comprising a desired response with a first value and associating each of the received responses comprising an undesired response with a second value. In some embodiments, these values can be stored in association with their received response in the user profile database 301 and/or in any other desired database in the database server 104.

After the responses have been evaluated, the process 1100 proceeds to block 1110 wherein user misconceptions are identified based on evaluated responses. In some embodiments, this can include identifying one or several misconceptions and/or identifying the users having those one or several misconceptions. In some embodiments, these user misconceptions can be identified based on one or several commonalities in attributes of responses received in block 1106 as indicated by the evaluation of the responses in block 1108. In some embodiments, the user misconceptions can be identified by the server 102 and specifically by the response processor 678, and/or the model engine 682.

After the user misconceptions have been identified, the process 1100 proceeds to block 1112 wherein one or several remediations are selected and provided to users identified with the misconception. In some embodiments, this can include identifying one or several data packets associated with the misconception such as, for example, the data packet provided in block 1104. In some embodiments, the selecting and the providing of the remediation can comprise the identification of these one or several data packets associated with the misconception and generating and sending an alert to, for example, the supervisor device 110 requesting modification and/or replacing of these one or several data packets. In some embodiments, this alert can be generated and sent as described above. In some embodiments, this can include selecting and providing one or several data packets containing content configured to address and/or remedy the misconceptions. In some embodiments, the users receiving the remediation's can be user is identified as having a user misconception in block 1110.

Figure 18:
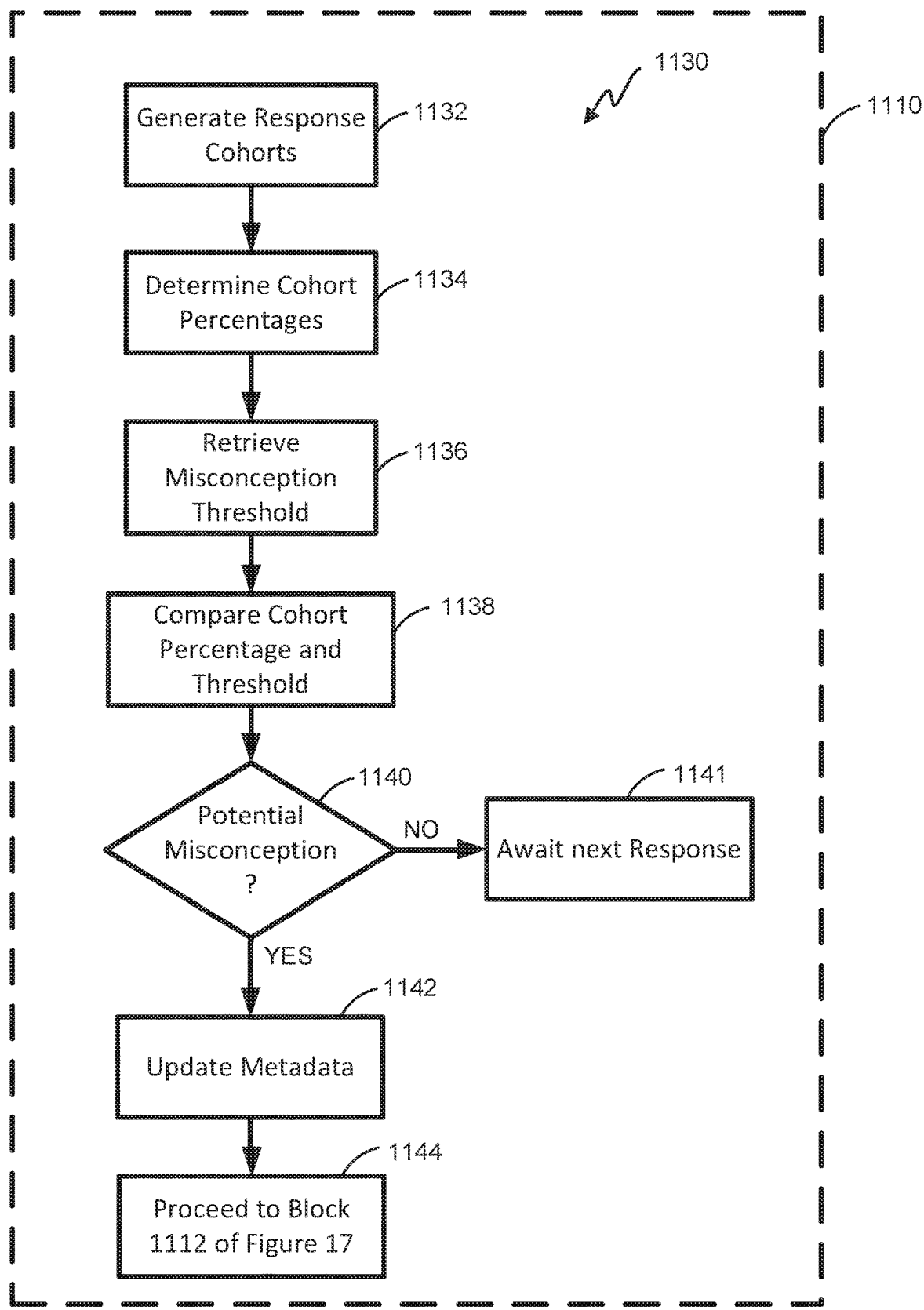
FIG. 18 is a flowchart illustrating one embodiment of a process for identifying a user misconception.

With reference now to FIG. 18, a flowchart illustrating one embodiment of a process 1130 for identifying a user misconception is shown. The process 1130 can be performed as a part of or in the place of block 1110 of FIG. 17. In some embodiments, the process 1130 can be performed by the content distribution network 100 and/or components thereof including the server. In some embodiments, the process 1130 can be performed using the engines and/or modules shown in FIGS. 9A to 9D.

The process begins at block 1132 wherein one or several response cohorts are generated. In some embodiments, each of these one or several response cohorts can identify users having similarly situated responses. In some embodiments, this can include grouping users in cohorts according to whether there provided response was a desired response or an undesired response and/or according to the reason for their response being a desired response or an undesired response. In the context of a response to a select response question such as a multiple choice question or a true/false question, cohorts may be formed according to the response selected by the user. In the case of a response to a constructed response question, cohorts may be formed according to one or several user steps performed as part of the response, to user provided reasons supporting the response, or the like. In some embodiments, a user can be associated with the value indicative of the response cohort into which they are placed. The response cohorts can be generated by the server 100 to and specifically by the response processor 678.

After the response cohorts of been generated, the process 1130 proceeds to block 1134 wherein cohort percentages are determined. In some embodiments, a cohort percentage can comprise the percentage of users in the user cohort identified in block 1102 that are found in each of the response cohorts generated in block 1132. In some embodiments, a cohort percentage can comprise the percentage of response providing users in the user cohort identified in block 1102 that are found in each of the response cohorts generated in block 1132. In some embodiments, the cohort percentages can be determined by the server 102 and specifically by the response processor 678.

After the cohort percentages have been determined, the process 1130 proceeds to block 1136 wherein a misconception threshold is retrieved. In some embodiments, the misconception threshold can delineate between situations in which the likelihood of the existence of a misconception is sufficiently minimal as to warrant no intervention and/or remediation and situations in which the likelihood of the existence of a misconception is sufficiently large as to warrant an intervention and/or remediation. In some embodiments, the misconception threshold can be retrieved from the database server 104 and specifically from the threshold database 310 in the database server 104.

After the misconception threshold has been retrieved, the process 1130 proceeds block 1138 wherein the cohort percentages are compared with the misconception threshold. In some embodiments, this comparison can determine whether the cohort percentage indicates a sufficiently large likelihood of the existence of a misconception to warrant an intervention and/or remediation. In some embodiments, if the comparison of the cohort percentage and the misconception threshold indicates a sufficiently large likelihood of the existence of misconception as to warrant an intervention, a first value can be associated with that cohort, and if the comparison of the cohort percentage in the misconception threshold indicates an insufficiently large likelihood of the existence of a misconception to warrant an intervention, a second value can be associated with that cohort. In some embodiments, the cohort percentage can be compared with the misconception threshold by the server 102 including, for example, the response processor 678 and/or the model engine 682.

After the cohort percentage has been compared to the misconception threshold, the process 1130 proceeds to decision state 1140 wherein it is determined if a potential misconception has been identified. In some embodiments, this can include determining whether the first or second value is associated with a response cohort. More specifically, this can include selecting one of the response cohorts and determining whether that selected one of the response cohorts is associated with the first or second value. If the selected one of the response cohorts is associate with the first value then a potential misconception is identified, alternatively, if the selected one of the response cohorts is associated with a second value then no potential misconception has been identified. In some embodiments, this can be repeated until each of the response cohorts has been evaluated to determine whether it is associated with the potential misconception. If it is determined that the selected one of the potential cohorts is not associated with the potential misconception, then the process 1130 can proceed to block 1141 and await a next response. In some embodiments, after the next responses been received, the process can proceed to block 1108 of FIG. 17.

Returning again to decision state 1140, if it is determined that a potential misconception has been identified, and the process 1130 proceeds to block 1142 wherein metadata is updated. In some embodiments, this can include updating the user data of users in some or all of the response cohorts, and in some embodiments, this can include updating metadata relating to the data packet provided in, for example, block 1104 of FIG. 17. After the metadata has been updated, the process 1130 proceeds to block 1144 and continues to block 1112 of FIG. 17.

Figure 19:
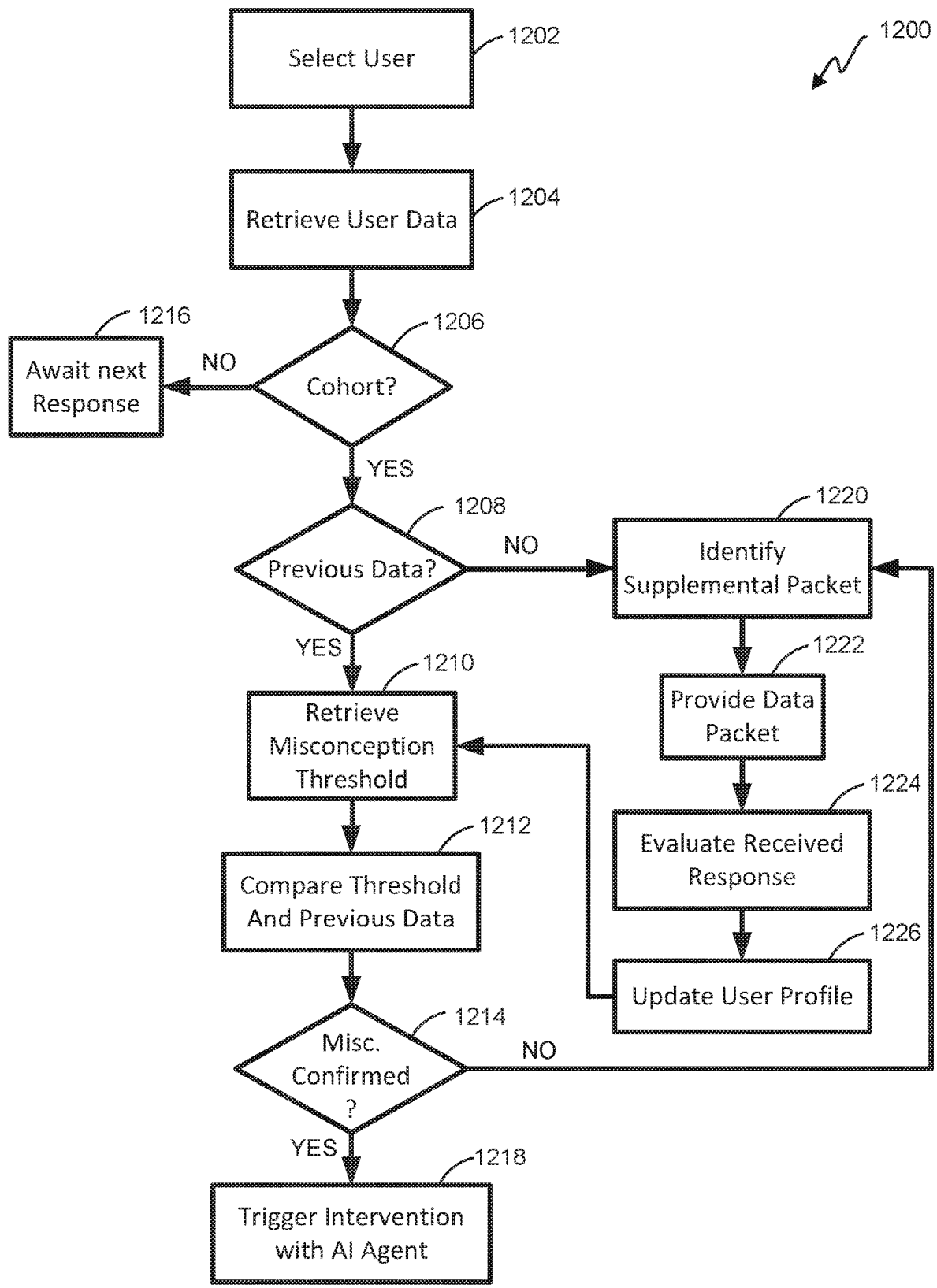
FIG. 19 is a flowchart illustrating one embodiment of a process for automatically triggering an intervention.

With reference now to FIG. 19, a flowchart illustrating one embodiment of a process 1200 for automatically triggering an intervention is shown. In some embodiments, this can comprise an intervention for an individual with an identified misconception. In some embodiments, this intervention can comprise a targeted intervention that can comprise additional content, questions, assessments, or the like. In some embodiments, this intervention can be provided in the form of one or several additional data packets. In some embodiments, this intervention can comprise interaction with an AI (Artificial Intelligence or Artificially Intelligent) agent. In some embodiments, the AI agent can comprise a question answering computing system, all or portions of an intelligent tutoring system, pedagogical agent, or the like. In some embodiments, the functioning of the AI agent can be predicated upon artificial intelligence, machine learning, or the like. In some embodiments, the AI agent can reside in the server 102 and/or another component of the content distribution network 100. In some embodiments, the process 1200 can be performed by the server 102 and/or other component of the content distribution network 100 including, for example, the engines and/or modules shown in FIGS. 9A to 9D.

The process 1200 begins a block 1202 wherein a user is selected. In some embodiments, the user can be selected from several users associated with user data in the user profile database 301. In some embodiments, the user can be selected by the server 102. After the user has been selected, the process 1200 proceeds block 1204 wherein the user data associated with the user selected in block 1202 is retrieved. In some embodiments, this user data can comprise user metadata that can identify one or several attributes of the user including evaluation results for one or several previous responses of the selected user. In some embodiments, the user metadata can be retrieved from the user profile database 301 by, for example, the server 102.

After the user data has been retrieved, the process 1200 proceeds to decision state 1206 wherein it is determined if the selected user is associated with a potential misconception. In some embodiments, this can include determining if the selected user belongs to a cohort associated with the first value indicative of a potential misconception. In some embodiments, this first value can be stored in the user metadata as indicated in block 1142 of FIG. 18. In some embodiments, determining if the selected user belongs to a cohort associate with the first value comprises extracting portions of the user metadata indicative of whether the user belongs to such a cohort.

In some embodiments, determining if the selected user is associated with a potential misconception can include determining if the selected user is associated with one or several nodes associated with a misconception. In some embodiments, for example, in which the process 1100 and 1130 of FIGS. 17 and 18 have been performed, metadata associated with one or several data packets can identify these data packets as being previously associated with a misconception. In some embodiments, determining if the selected user is associated with a potential misconception can include determining whether the selected user has traversed and/or received content associated with one or several nodes having metadata identifying previous associated misconceptions. In some embodiments, if the selected user is associated with one or several such nodes, a value indicating a likelihood of misconception can be generated based on, for example, a comparison of one or several attributes to attributes of users who previously had misconceptions. If this value indicating the likelihood of misconception is sufficiently high, then the user can be flagged as having a potential misconception. If it is determined that the selected user has a potential misconception, then the process 1200 proceeds block 1216 and awaits the next response.

Returning again to decision state 1206, if it is determined that the user belongs to a cohort associated with the first value indicative of potential misconception, then the process 1200 proceeds to decision state 1208 where it is determined if the user metadata contains additional data indicative of a misconception relevant to the cohort associated with the first value indicative of a potential misconception to which the selected user belongs as determined in decision state 1206. In some embodiments, this can include identifying one or several other responses provided by the user selected in block 1202 and/or metadata relating to one or several other responses provided by the user selected in block 1202, and determining whether these one or several other responses are indicative of the relevant misconception. In some embodiments, this determination can be performed by the server 102

If one or several previous responses indicative of a misconception relevant to the cohort associated with the first value and/or metadata relating to one or several previous responses indicative of a misconception relevant to the cohort associated with the first value are identified, then the process 1200 proceeds to block 1210 wherein the misconception threshold is retrieved.

In some embodiments, misconception threshold can be the same threshold as retrieved in block 1136 of FIG. 18, and in some embodiments, the misconception threshold retrieved in block 1210 can be different than the misconception threshold retrieved in block 1136 of FIG. 18. In some embodiments, for example, the misconception threshold retrieved in block 1136 of FIG. 18 can be used for identifying a misconception relevant to a data packet, and/or a misconception relevant to the user cohort identified in block 1102 of FIG. 17.

As the misconception threshold identified in block 1210 of FIG. 19 is used for identifying a misconception in a single user, the threshold value may be different than those using the above referenced other circumstances. Similarly, as the user cohort identified in block 1102 of FIG. 17 can, by itself, provide a statistically significant sample, a misconception can be identified relevant to a data packet and/or user cohort is identified in block 1102 of FIG. 17 based on a set of responses from that cohort selected in block 1102 of FIG. 17 to a single data packet whereas the identification of a misconception for single user may require responses to a plurality of data packets. In some embodiments, the value of the misconception threshold can vary based on the responses provided by the user and/or the metadata relating to the responses provided by the user. In some embodiments, for example, a higher threshold may be required for selected response type responses due to uncertainty resulting from the role of guessing in responding to such type responses. The misconception threshold can be retrieved by the server 102 from the threshold database 310.

After the misconception threshold has been retrieved, the process 1200 proceeds to block 1212 wherein the misconception threshold is compared with some or all the portions of the user metadata relevant to the potential misconception associated with the cohort including the user. In some embodiments, this can include determining a likelihood of the existence of a misconception based on the aggregate of some or all the user responses relevant to that misconception. In some embodiments, the comparison of the misconception threshold and some or all the portions the user data relevant to the potential misconception can be performed by the server 102.

After the misconception threshold and the user metadata relevant to the misconception have been compared, the process 1200 proceeds block 1214 wherein it is determined if the misconception is confirmed. In some embodiments, this can include determining whether the some or all of the metadata associated with and/or relevant to the potential misconception indicated a sufficiently high a likelihood of a misconception as to warrant an intervention. If it is determined that an intervention is warranted, then the process 1200 can proceed to block 1218 and an intervention can be triggered. In some embodiments, this intervention can comprise a targeted intervention that can include the delivery of content to remedy the one or several identified misconceptions. In some embodiments, this intervention can comprise one or several interactions with an AI agent. In some embodiments, this can include generating and sending an alert to the AI agent, the user device 106 of the user selected in block 1202 and/or two the supervisor device 110 of the supervisor of the user selected in block 1202. In some embodiments, this alert can include computer code configured to trigger the automatic operation of the AI agent and/or to automatically display one or several pieces of data such as, for example, identification of the misconception determined in decision state 1214.

Returning again to decision state 1214, if it is determined that the misconception has not been confirmed, or returning to decision state 1208, if it is determined that the user selected in block trouble to is not associated with metadata relevant to the potential misconception associated with the cohort in which the user belongs, then the process 1200 can proceed to block 1220 wherein a supplemental data packet is identified. In some embodiments, the supplemental data packet can be identified and/or selected from the set of data packets contained in the content library database 303. In some embodiments, the supplemental data packet can be selected based on the relevance of the anticipated response to the selected data packet to determining whether the can be verified and/or that an intervention for the potential misconception is warranted. In some embodiments, the supplemental data packet can be selected by the server 102 and/or the recommendation engine 686.

After the supplemental data packet has been selected, the process 1200 can proceed to block 1222 wherein the data packet can be provided to the user selected in block 1202. In some embodiments, the data packet can be provided to the user selected in block 1202 by providing the data packet to the presenter module 672 which can then provide the data packet to the view module 674 which can then provide the data packet to the user of the user device 106 via the I/O subsystem 526.

After the data packet has been provided to the user, the process 1200 proceeds block 1224 wherein a response to the data packet provided in block 1222 is received and evaluated. In some embodiments, the response can be received by the presenter module 672 via the view module 674, the I/O subsystem 526, and the user device 106, and the response can be evaluated by the response processor 678. In some embodiments, the response can be evaluated using comparative data retrieved from the database server 104 and specifically from the content library database 303.

After the responses been evaluated, the process 1200 proceeds block 1226 wherein the user profile and/or user metadata is updated. In some embodiments, this can include the updating of one or several models associated with the user and/or the user metadata to reflect the result of the evaluation of the received response from block 1224. In some embodiments, the user metadata can be updated by the model engine 682. After the user profile and/or user metadata has been updated, the process 1200 returns to block 1210 and proceeds as outlined above.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein, the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read-only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for automatic targeted intervention, the system comprising:
   memory comprising:
      a user profile database comprising information relating to a plurality of users, wherein the information relating to the plurality of users comprises unique information associated with each of the users in the plurality of users; and
      a threshold database comprising a misconception threshold delineating between an acceptable and an unacceptable probability of the existence of a misconception;
   a user device comprising:
      a first network interface configured to exchange data via a communication network; and
      a first I/O subsystem configured to convert electrical signals to user interpretable outputs via a graphical user interface (GUI); and
   one or more servers configured to:
      execute a first database query selecting, from the user profile database, a user data for a user, wherein the user is one of the plurality of users;
      receive, in response to a second database query, user metadata associated with the user, from the user profile database;
      determine, via at least one user attribute within the user metadata, that the user is potentially associated with a misconception;
      retrieve, in response to a third database query of the user profile database, misconception metadata associated in the user profile database with the user indicative of the presence or absence of the misconception associated with the user;
      determine that the misconception metadata does not meet the misconception threshold indicating the presence of the misconception associated with the user;
      generate the GUI, configured to display, on the user device, each of a plurality of prompts for determining the presence or absence of the misconception;
      transmit the GUI to the user device;
      receive, via transmission from the user device, a user input from the GUI comprising a response to each of the plurality of prompts;
      determine, according to a comparison of each response to a correct response database, whether the response to each of the plurality of prompts is correct or incorrect;
      update the user metadata and the misconception metadata based on whether the response to each of the plurality of prompts received from the user is a correct response or an incorrect response;
      confirm the presence of the misconception based on the updated user metadata, via a determination that the misconception metadata meets the misconception threshold; and
      automatically trigger a targeted intervention.

2. The system of claim 1, wherein determining that the user is associated with the misconception comprises determining that the user is associated with a cohort linked with the misconception.

3. The system of claim 2, wherein the cohort comprises a group of some of the plurality of users having common attributes of observables generated from responses provided by the plurality of users in the cohort.

4. The system of claim 1, wherein determining that the user is associated with the misconception comprises determining that the user is associated with one or several nodes associated with the misconception.

5. The system of claim 4, wherein the memory further comprises a content library database comprising a plurality of nodes arranged in a content network, wherein the one or several nodes are stored in the content library database.

6. The system of claim 1, wherein the targeted intervention is triggered via an AI agent communicatingly linked with the user device via a communication network.

7. The system of claim 6, wherein the AI agent comprises a pedagogical agent.

8. The system of claim 7, wherein automatically triggering a targeted intervention comprises generating and sending an alert to the user device.

9. The system of claim 8, wherein the alert comprises code to direct the user device to provide an indicator of the alert.

10. The system of claim 9, wherein the indicator of the alert comprises at least on of: an aural indicator; a tactile indicator; or visual indicator.

11. The system of claim 10, wherein the one or more servers are further configured to:
    identify a supplemental data packet;
    provide the supplemental data packet to the user; and
    receive a response from the user, wherein the response is to the provided supplemental data packet.

12. The system of claim 11, wherein the one or more servers are further configured to evaluate the received response.

13. A method for automatic targeted intervention triggering comprising:
    executing a first database query selecting, from a user profile database, a user data for a user with at least one server;
    receiving, in response to a second database query, user metadata associated with the user from the user profile database in a memory at the at least one server;
    determining, via at least one user attribute within the user metadata, that the user is potentially associated with a misconception;
    retrieving, in response to a third database query of the user profile database, misconception metadata associated in the user profile database with the user indicative of the presence or absence of the misconception with which the user is associated;
    determining that the misconception metadata does not meet a misconception threshold indicating the presence of the misconception with which the user is associated;
    generating a GUI, configured to display, on a user device, each of a plurality of prompts for determining the presence or absence of the misconception;
    transmitting the GUI to the user device;
    receiving, via transmission from the user device, a user input from the GUI comprising a response to each of the plurality of prompts;
    determining, according to a comparison of each response to a correct response database, whether the response to each of the plurality of prompts is correct or incorrect
    updating the user metadata and the misconception metadata based on whether the response to each of the plurality of prompts received from the user is a correct response or an incorrect response;
    confirming the presence of the misconception based on the updated user metadata, via a determination that the misconception metadata meets the misconception threshold; and
    automatically triggering delivery of a targeted intervention.

14. The method of claim 13, wherein the user is selected from a plurality of users identified in the user profile database.

15. The method of claim 14, wherein determining that the user is associated with the misconception comprises determining that the user is associated with a cohort linked with the misconception.

16. The method of claim 15, wherein the cohort comprises a group of some of the plurality of users having common attributes of observables generated from responses provided by the plurality of users in the cohort.

17. The method of claim 13, wherein determining that the user is associated with the misconception comprises determining that the user is associated with one or several nodes associated with the misconception.

18. The method of claim 13, wherein the targeted intervention is triggered via an AI agent communicatingly linked with a user device via a communication network.

19. The system of claim 18, wherein the AI agent comprises a pedagogical agent.

20. The system of claim 18, wherein automatically triggering a targeted intervention comprises generating and sending an alert to the user device, wherein the alert comprises code to direct the user device to provide an indicator of the received alert, and wherein the alert comprises at least on of: an aural indicator; a tactile indicator; or visual indicator.

* * * * *